United States Patent [19]

Richard et al.

[11] 4,363,103

[45] Dec. 7, 1982

[54] DEVICE FOR FOLLOWING AND ESTIMATING THE LOCAL STATE OF PICTURE CONTOURS

[75] Inventors: Christian Richard, Rennes; Francis Kretz, Cesson Sevigne; Albert Benveniste, Rennes, all of France

[73] Assignees: L'Etat Francais represente par le Secretaire d'Etat aux Postes et Telecommunications et a la Telediffusion (Centre National d'Etudes des Telecommunications), Issy les Moulineaux; Etablissement Public de Diffusion dit "Telediffusion de France", Montrouge, both of France

[21] Appl. No.: 158,588

[22] Filed: Jun. 11, 1980

[30] Foreign Application Priority Data

Jun. 29, 1979 [FR] France .................. 79 16914

[51] Int. Cl.³ .................. H04N 7/13; H04N 5/40; G06F 15/20
[52] U.S. Cl. .................. 364/515; 358/136; 375/27
[58] Field of Search .................. 364/515; 358/135, 136; 375/27

[56] References Cited

U.S. PATENT DOCUMENTS

| 3,825,832 | 7/1974 | Frei et al. ................ 358/135 |
| 4,075,655 | 2/1978 | Iijima et al. ............. 364/515 X |
| 4,133,006 | 1/1979 | Iinuma .................. 358/136 X |
| 4,141,034 | 2/1979 | Netravali et al. ......... 358/135 X |
| 4,144,543 | 3/1979 | Koga .................... 358/136 |
| 4,173,771 | 11/1979 | Iijima .................. 358/135 |
| 4,200,886 | 4/1980 | Musmann et al. ......... 358/135 |

FOREIGN PATENT DOCUMENTS

| 2309444 | 8/1974 | Fed. Rep. of Germany ........ 375/27 |
| 2277482 | 1/1976 | France .................. 375/27 |
| 2001503 | 1/1979 | United Kingdom ............ 358/284 |

Primary Examiner—Felix D. Gruber

[57] ABSTRACT

A device for following and recursively estimating the local state of picture contours defined by lines of N points distributed in accordance with an orthogonal sampling structure, said points being defined by successive numerical samples.

The invention also relates to a differential coded pulse modulation coder and a differential coded pulse modulation decoder.

13 Claims, 15 Drawing Figures

DEVICE FOR FOLLOWING AND ESTIMATING THE LOCAL STATE OF PICTURE CONTOURS

BACKGROUND OF THE INVENTION

The present invention relates to a device for following and recursively estimating the local state of picture contours, particularly for the purpose of the adaptive prediction for the differential coding of television signals.

Coding using differential pulse code modulation (DPCM) has already been the subject of numerous study, published more particularly in the following articles:

"Predictive Quantizing Systems (Differential Pulse Code Modulation) for the Transmission of Television Signals" by J. B. O'Neal, published in the American Journal "Bell System Technical Journal", Vol. 45, pages 689 to 721, May 1966.

"System for the Numerical Coding of the Television Picture—the OCCITAN Project", by J. PONCIN and J. SABATIER published in the French Journal "L'echo des recherches", Jan. 1976, pp. 28 to 37. "Degradation of image signals and subjective quality in digital coding: visibility of the contour flutter" by F. KRETZ and J. L. Boudeville, published in the French Journal "Annales des Telecommunications", Vol. 31, No. 9–10, September/October 1976.

In DPCM coding, the difference between the real value of a television signal sample and a prediction (estimate) of this value calculated on the basis of prior close coded samples is coded. This difference is quantized and coded. Numerous studies have been carried out on the quantization characteristic. Conventionally it is unique and symmetrical with respect to the value 0, but other types of quantization have been envisaged and are for example described in the following documents:

French Pat. No. PV 77 26773 "Compression and expansion (Quantization) of numerical television signals with differential coding", inventors F. KRETZ and J. L. BOUDEVILLE.

"Optimization of DPCM video scheme using subjective quality criterion", by F. KRETZ and J. L. BOUDEVILLE amd P. SALLIO, published in the reports of the IERE Conference, No. 37, September 1977, pp. 185-194. First Certificate of Addition to Pat. No. PV 78 26773, referred to hereinbefore, PV 78 35485, inventors J. KRETZ and J. L. BOUDEVILLE. "A DPCM system with bidimensional predictor and controlled quantizer", by T. KUMMEROW, published in the reports of "TAGUNGSBERICHT NITG-FACHTAGUNG: Signalverarbeitung", April 1973, ERLANGEN, pp. 425–439. "Adaptive quantization oı picture signals using spatial masking" by A. NETRAVALI and B. PRAVADA, published in the American Journal "Proceedings of the IEEE", April 1977, pp. 536–548.

With regard to the digital transmission of a television signal, the Union Europeenne de Radio-diffusion provided for the use of a transmission system standardized by CCITT with a flow rate of 34 Mbit/s. It was possible to realise such a system by separately coding the components and by using the invention described in the First Certificate of Addition to the aforementioned patents for coding the luminant signal. Thus, a good quality of the restored pictures was obtained.

For this application, it is useful to attempt to further improve the quality obtained by more complex coding. For other applications, it can be useful to reduce the flow rate to the minimum possible value according to conventional methods, whilst retaining a given quality.

Much research was carried out with this objective leading to an adaptive prediction. Reference is for example made to the following articles: "Predictive quantizing of television signals" by R. E. GRAHAM, published in the reports to IRE Wescon Convention record, Vol. 2, part 4, 1958, pp. 147 to 157. "DPCM picture coding with adaptive prediction" by W. ZSCHUNKE published in the American Journal IEEE Tr on Com., Vol. COM 25, No. 11, November 1977, pp. 1295 to 1302.

In this research, the prediction is selected from a number of predictions, each corresponding to the value of a prior point close to the point to be coded or to a simple linear combination of the prior values of close points to the point to be coded. Each prediction is adapted to a given local orientation of the picture (i.e. to the case of a contour of this orientation passing in the vicinity of the point to be coded). A decision organ estimates the local orientation and as a result selects the appropriate prediction. The two last-mentioned studies referred to hereinbefore use estimates based on simple tests on the differences between prior points close to the point to be coded.

Before defining the invention, a number of definitions will be given with respect to the motions and magnitudes relating to the treated pictures.

The invention more essentially applies to images formed from lines of equidistant points disposed in the centres of rectangles formed by a double group of orthogonal lines and which is generally called "orthogonal sampling structure". The invention also applies to the case of a "staggered field sampling structure" (cf article by J. SABATIER and F. KRETZ entitled "The sampling of the components of 625 line colour television signals", published in the UER Technical Journal, No. 171. October 1978, pp. 212 to 215). FIG. 1a illustrates this structure. All the lines are assumed to contain N points which, in the case of application to television images, are the end points forming a line of the video signal, the number of lines being dependent on the adopted standard. Each point of the line is characterized by an optical quantity, namely either the luminance, or the chromaticity, or any other signal of this type (e.g. the luminant signal or the difference signals). This quantity is determined by the sampled electrical signal X with different marks or accents.

When two adjacent points have an amplitude difference which exceeds a certain threshold, there is "a picture contour element", which is horizontal if the two points are next to each other and vertical if the two points are one below the other. Each element of the contour is represented, as in FIG. 1, by a line between the two points in question and designated EH for the first and EV for the second.

Two horizontal or vertical contour elements are said to be connected if two of their ends are connected. Thus, a contour is defined by a system of connected contour elements or by the system of points adjacent thereto. The average contour curve represents in some way the location of points of the same amplitude for example of the same lighting intensity. The contours shown in exemplified manner in FIG. 1a has 6 vertical contour elements and 4 horizontal contour elements.

At all points, such a contour has an average orientation which is given by the tangent to the mean curve of the contour. This orientation is taken with respect to the vertical and is designated $\theta$. One of the objects of the invention relates to the estimation of this orientation for each line.

Naturally, all the contour elements of one picture are not necessarily connected and certain of them can be isolated. In the line by line following of contours and their observation in each line, significance is attached to the contour elements belonging to one and the same line and which are connected. Such elements from systems called "connected zones". FIG. 1a shows a connected zone, considered as an integral part of a contour. It starts by a first contour element (in the present case a horizontal element) and finishes by a final contour element (in the present case a vertical element). The latter element indicates the end of a connected zone. One point of the picture can belong to a connected zone and in the opposite case it is located in a "hole".

In the current or present line, the "past" of the observed contour is summarized by certain quantities necessary for following the contour and for the estimation of the local orientation. All these quantities constitute the "state" of the contour and is designated E. They are:

H and V: the average number of horizontal and vertical contour elements filtered recursively during the following or tracking of the contour;

NM: the number of prior operations observed during the following of the contour;

NP: the number of vertical contour elements, but which are not connected to horizontal contour elements observed in the lines preceding the line being processed;

NS Partial sum of the signs observed $\overline{S}$ during the following of the contour, a distinction being made between its absolute value $|NS|$ and its sign S, called the contour sign;

Q; counts the observed sign inversions ($\overline{S}$. S<O) with a view to an interruption test of the following of the contour.

In certain cases, two or more than two contours can intercept to form a figure which is called a "fork". The two contours forming a fork each have a state (E' and E_i') from which can be extracted at the intersection point a state which will be "interpolated" and designated E.

As in the scanning of television pictures, the examination of a picture takes place line by line and point by point.

FIG. 1a shows the geometrical distribution of the present point and adjacent prior points, whilst FIG. 1c shows the angular convention used for the orientations ($\theta$ from $-\pi/2$ to $+\pi/2$, $\theta>0$ in the drawing) and their discretization.

FIG. 1b shows the position of various points which will be used with the notations: $X_n$ for the values to be coded, $\hat{X}_n$ for the decoded values, the prime in $\hat{X}_n'$ designates the points of the preceding line and will in general designate signals carrying data corresponding to the preceding line. For the present or current line, consideration will be given to the current point at time n, ($X_n$) or a time n+1 ($X_{n+1}$) in certain cases, so that the final decoded point is $\hat{X}_n$.

FIG. 1c shows the angular convention ($\theta$ is considered relative to the vertical and is positive in the drawing, as well as the discretization of the angles which, in the present embodiment (table VI-a) has three module bits and one sign bit. In the drawing, the followed contour at the point of rank n−J has an estimated orientation $\theta$ of discretized value +1. The prediction is prepared on the present line for the following line by calculating a linear combination defined by $\theta$ of the values of $\hat{X}_{n-J}$ and $\hat{X}_{n-J+1}$ which concern a point defined by $\theta$ in the following lines.

BRIEF SUMMARY OF THE INVENTION

Following the definitions of the terminology it is pointed out that the invention relates to the following of the contours and a recursive estimation of their state E which contains a number of significant contour parameters and from which is extracted an estimate of the orientation $\theta$. At the current point to be coded, the horizontal contour elements $EH_n$ and vertical contour elements $EV_n$ are observed by a test of the amplitude of the associated local gradients and to follow the connected zone along the present line and relative to the preceding line. The complete observation of a connected zone makes it possible on the one hand to generate a signal for the end of the connected zone $FZC_n$ and a signal for the absence of contour elements $HOLE_n$ and on the other to count the total number of horizontal and vertical contour elements observed $\overline{H}$ and $\overline{V}$.

In the connected zones, the invention provides for a processing of the "fork" where an interpolated state $\tilde{E}$ is then calculated from the states of the two last contours of the fork in the preceding line and on the other a calculation of the sign observed $\overline{S}$ in the present line. The state $\tilde{E}$ is then updated again on the basis of observations $\overline{H}$, $\overline{V}$, $\overline{S}$. If the connected zone observed in the present line is not connected to a connected zone of the preceding line an initialization of the state takes place. These two operations of initialization and re-updating constitute the calculation of the new state E of the contour.

The invention provides for the storage of the states E corresponding to the various connected zones observed on the present or current line (E') in order that they can be used in the following line. The state memory has a random access. In the same way, signals $EV_n$ and $FZC_n$ ($EV_n'$ and $FZC_n'$) are stored during one line.

According to the invention, the state E, as well as signal $EV_n$ and $FZC_n$ are used for preparing a prediction from the values of prior points adjacent to the points to be coded. This preparation of the prediction is stored for one line, so that it can be read during the following line. Thus, for the current line, there is a preparation of the prediction $\overline{P}_{n+1}$ which contains the information necessary for the final calculation at the current point of the prediction $P_{n+1}$.

More specifically, the invention relates to a device for following and recursively estimating the local state of the contours of a picture, which comprises:

(A) a sequential memory or store able to supply, when it receives the sample of blank n+1 respectively the sample of rank n, i.e. $\hat{X}_n$, the sample of rank n−1, i.e. $\hat{X}_{n-1}$ belonging to the same line as the sample received and the sample of rank n belonging to the preceding line, i.e. $\hat{X}_n$;

(B) an examination circuit incorporating: means for detecting a vertical contour element $EV_n$ between two successive samples $\hat{X}_{n-1}$ and $\hat{X}_n$ of the same line;

means for detecting a horizontal contour element $EH_n$ between two samples $\hat{X}_n'$ and $\hat{X}_n$ of the same rank, but belonging to two adjacent lines; means for detecting the absence of contour elements, said means supplying a signal designated $HOLE_n$; means for counting the total number of horizontal contour elements and the total number of vertical contour elements examined along one line for each connected zone, said numbers being translated into $\overline{H}$ and $\overline{V}$ at the end of the connected zone; means for detecting the connected zones and which is able to supply a signal when a connected zone is terminated at the point of rank n, the signal being designated $FZC_n$;

(C) a loop functioning in a recursive manner comprising means for calculating the state of the contour, for storing the state E' obtained for the line preceding that which is examined and for calculating, as a function of the said state E' and signals $EH_n$, $HOLE_n$, $FZC_n$, $\overline{V}$ and $\overline{H}$ obtained for the examined line, the new state E of the contour in said examined line.

The invention also relates to a sample prediction device for television pictures and which comprises:

(A) a device for following and recursively estimating the orientation of the picture contours as defined hereinbefore and wherein:

the sequential memory is provided with two supplementary outputs supplying samples $\hat{X}_{n-J+1}$ and $\hat{X}_{n-J}$;

the recursive loop has two outputs respectively supplying:

(i) a signal $EV_n$ indicating the presence of a vertical contour element for the point of rank n, (ii) the signal $FZC_n$;

the recursive loop has an output supplying the signal EJ determining the state of the contour at the point of rank n−J;

(B) a circuit for the preparation of a prediction and for storing said prepared prediction and which incorporates means for calculating the linear combination of signals $\hat{X}_{n-J}$ and $\hat{X}_{n-J+1}$ dependent on the state EJ and the signals $EV_n$ and $FZC_n$, and a direct access memory which stores the function at an address which is dependent on the rank n−J and on the state EJ, said memory having an output which supplies a signal $\overline{P}_{n+1}$ for the input sample of rank N+1;

(C) a final calculation circuit for the prediction incorporating means for selecting $\overline{P}_{n+1}$ or $\hat{X}_n$ depending on the data contained in $\overline{P}_{n+1}$ and for addressing the selected value, namely $P_{n+1}$ to an output, said signal constituting the prediction sample of rank N+1.

BRIEF DESCRIPTION OF THE DRAWINGS

The invention is described in greater detail hereinafter relative to non-limitative embodiments and with reference to the drawings, wherein show.

DESCRIPTION OF THE PRIOR ART

Although the invention is of a more general nature, the following description refers to the case where the estimation of the contours is used for a prediction for the coding of television signals.

The understanding of the block diagrams described hereinafter necessitates the standard logic conventions. The synchronization of the operations requires delay circuits and counting registers, which are only shown when necessary for understanding. Thus, for example, the sampling clock of the television signal HP must be correctly delayed wherever it is necessary. The start of line signal is designated DL and rises to 1 during the blanking of lines and drops to zero immediately after it has risen to 1.

The binary signal PL carries the parity information of the current or present line (=1 for uneven lines of the same frame=zero for even lines). It changes logic states just before DL. According to conventional practice, the values of the X decoded points during line and field blanking operations will be imposed at a fixed value, for example zero. The signals $HOLE_n$, $FZC_n$, $EH_n$, $EV_n$, E, E', $EV_{n-J}$, $EV_n'$, $FZC_n'$ must be cancelled out during the same blanking operations. The circuits necessary for such zeroing operations are not shown. Finally, there are N points per active line.

Figure 2:
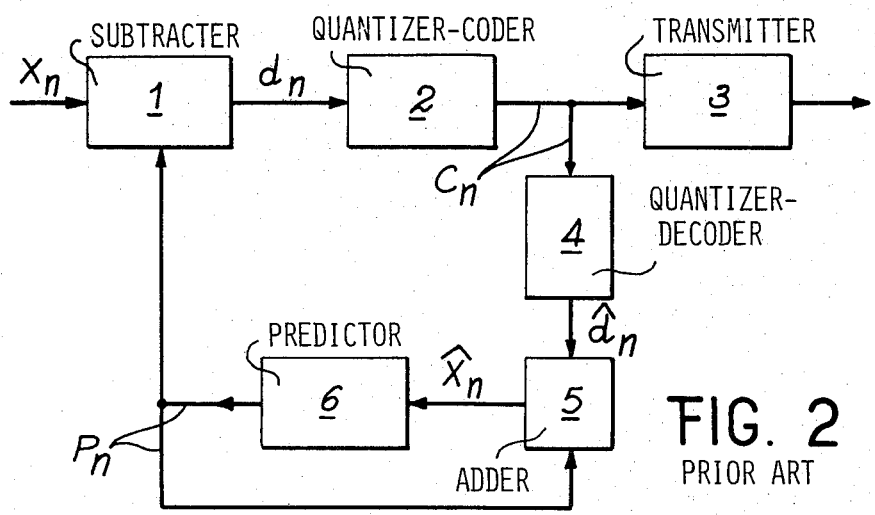
FIG. 2 a block diagram of a known DPCM coder used for coding television picture signals with compression.

The DPCM coder of FIG. 2 comprises an algebraic subtracter 1, whose first input is the input of the signal to be coded, designated $X_n$, and whose output is connected to the input of a quantizer-coder circuit 2. The output of the latter is on the one hand connected to a transmission member 3 and on the other to a quantizer—decoder circuit 4, whose output is connected to the first input of an algebraic adder circuit 5. The output of the latter is connected to a predictor circuit 6, whose output is connected on the one hand to a second input of the subtractor circuit 1 and on the other to a second input of the adder circuit 5.

In the present embodiment, the television signal $X_n$ to be coded is applied to the input in digital form, as supplied by a not shown conventional MIC coder. The subtracter 1 forms the difference $P_n$ between the numerical signal $X_n$ and a numerical prediction signal $P_n$ supplied by the predictor circuit 6. The quantizer—coder circuit can comprise a coding read-only memory in which the values $d_n$ supplied by subtracter 1 are considered as addresses to which correspond DPCM signals $C_n$ which are read and then applied to circuit 3 which transmits them. The numerical signals are also applied to the quantizer—decoder 4 which can comprise a read-only memory in which the values $C_n$ are considered as addresses to which corresponds numerical signals $\hat{d}_n$ constituting the re-formed differences. Adder 5 performs the conventional internal DPCM decoding operation and supplies a signal $\hat{X}_n$. This signal then enters the predictor circuit which contains memories for storing certain prior adjacent points $\hat{X}_{n-k}$, $K \geq 1$ of the same line and $\hat{X}'_m$ of the preceding line. This circuit will be described in greater detail relative to the following drawing and supplies the prediction $P_n$ used for subtracter 1 and adder 5.

Figure 3:
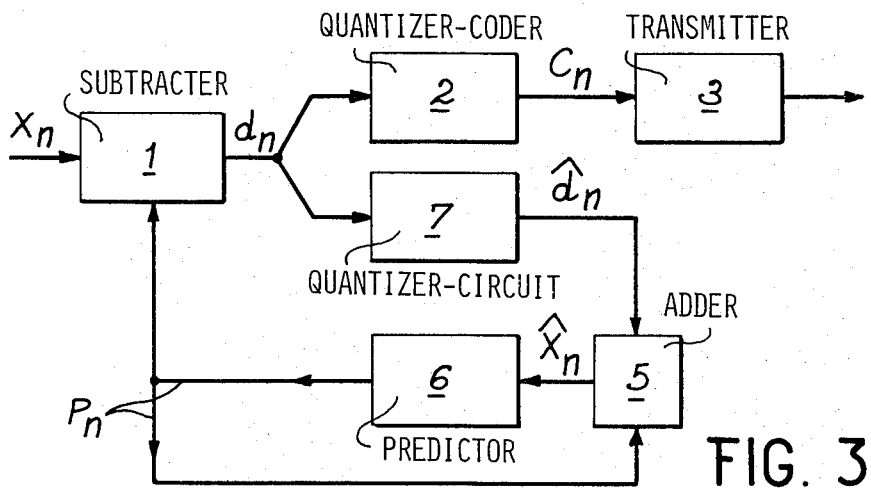
FIG. 3 a block diagram of a variant of the coder of FIG. 2.

The DPCM coder of FIG. 3 is a variant of that of FIG. 2. It comprises a subtractor circuit 1 which receives the signal $X_n$ to be coded at a first input and the prediction signal $P_n$ at a second input. The output of circuit 1 is on the one hand connected to the quantizer—coder circuit 2, identical to that of FIG. 2, and on the other hand to a quantizer circuit 7, whose output is connected to the first input of the adder circuit 5. The latter is identical to that of FIG. 2 and receives the prediction signal $P_n$ at a second input and its output is connected to the input of the predictor circuit 6, identical to that of FIG. 2. The output of circuit 2 is connected to the input of circuit 3, identical to that of FIG. 2.

In FIG. 3, circuit 7 can be constituted by a memory, whose addresses are constituted by numerical signal $d_n$ and signals $\hat{d}_n$ are read there. It thus directly performs the operation carried out by circuits 2 and 4 of the prediction loop described in FIG. 2. The remainder of the operation is identical to the operations described relative to FIG. 2.

Figure 4:
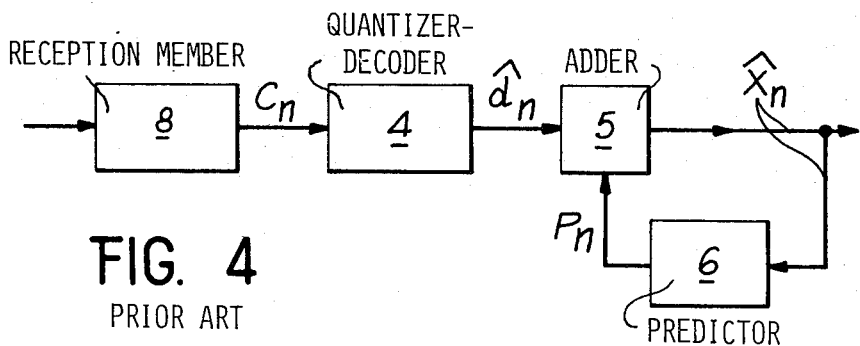
FIG. 4 a block diagram of a conventional DPCM decoder for reconstituting the DPCM-coded television picture signals.

The DPCM coder of FIG. 4 comprises an input circuit 8, which is a reception member, whose output is connected to the input of a quantizer—decoder circuit 4, whose output is connected to the first input of an adder circuit 5. The output of the latter is connected to the input of a circuit 6, whose output constitutes the second input of circuit 5. The latter circuit supplies the reconstituted signal $\hat{X}_n$, which after a digital—analog conversion, is applied to a not shown television receiver.

The operations performed in the decoder are of a conventional nature and apply to the two constructional variants of the coder described relative to FIGS. 2 and 3. The codes $C_n$ received are transformed in circuit 4, identical to that of FIG. 2, into re-formed differences $\hat{d}_n$. In circuit 5, $\hat{d}_n$ is added to prediction $P_n$ to supply the decoded signal $\hat{X}_n$, which enters the predictor circuit as in FIG. 2 or 3.

DETAILED DESCRIPTION OF THE PREFERRED EMBODIMENTS

The invention relates more specifically to prediction circuit 6, which will now be described relative to FIG. 5.

As shown, the predictor circuit comprises:

(A) a sequential memory having three circuits 9, 10 and 11 having an input which receives the sequence of digital samples and five outputs supplying, when the sample of rank $n+1$ is received at the input, respectively samples of rank n, i.e. $\hat{X}_n$, of rank $n-1$, i.e. $\hat{X}_{n-1}$ of rank $n-J+1$, i.e. $\hat{X}_{n-J+1}$, of rank $n-J$, i.e. $\hat{X}_{n-J}$, all belonging to the same line as the sample received and the sample of rank n belonging to the preceding line, i.e. $\hat{X}_n'$;

(B) an examination and recursive estimation circuit 12 of the state having three inputs receiving the signals $\hat{X}_n$, $\hat{X}_{n-1}$ and $\hat{X}_n'$ and three outputs respectively supplying:

(i) a signal EJ determining the state of the contour at the point of rank $n-J$,
(ii) a signal $EV_n$ indicating the presence of a vertical contour element for the point of rank n,
(iii) an end of connected zone signal $FZC_n$;

(C) a circuit 13 for the preparation of a prediction and for the storage of said prepared prediction and which has five main inputs, two of them receiving the samples $\hat{X}_{n-J}$ and $\hat{X}_{n-J+1}$ supplied by the memeory, the three others receiving the data EJ, $EV_n$ and $FZC_n$ supplied by circuit 12, said circuit comprising means for calculating a linear function of the signals $\hat{X}_{n-J}$ and $\hat{X}_{n-J+1}$, dependent on state EJ and signals $EV_n$ and $FZC_n$ and a direct access memory which stores the said function at an address which is dependent on the rank $n-J$ and the state EJ, said memory having an output which supplies a signal $\overline{P}_{n+1}$ for the input sample of rank $n+1$;

(D) a circuit 14 for the final calculation of the prediction having two inputs, one receiving the sample $\hat{X}_n$ of the memory and the other the signal $\overline{P}_{n+1}$ of the prediction preparation circuit 13, said circuit incorporating means for selecting $\overline{P}_{n+1}$ of $\hat{X}_n$, depending on the data contained in $\overline{P}_{n+1}$ and for addressing the selected value, i.e. $P_{n+1}$ to an output, said signal constituting the prediction sample of rank $n+1$.

The circuits 9, 10, 11, 12 and 13 are operated by the service signals HP (clock), DL (line start) and PL (line parity).

Circuits 12, 13 and 14 are described relative to FIGS. 6 to 13.

Figure 6:
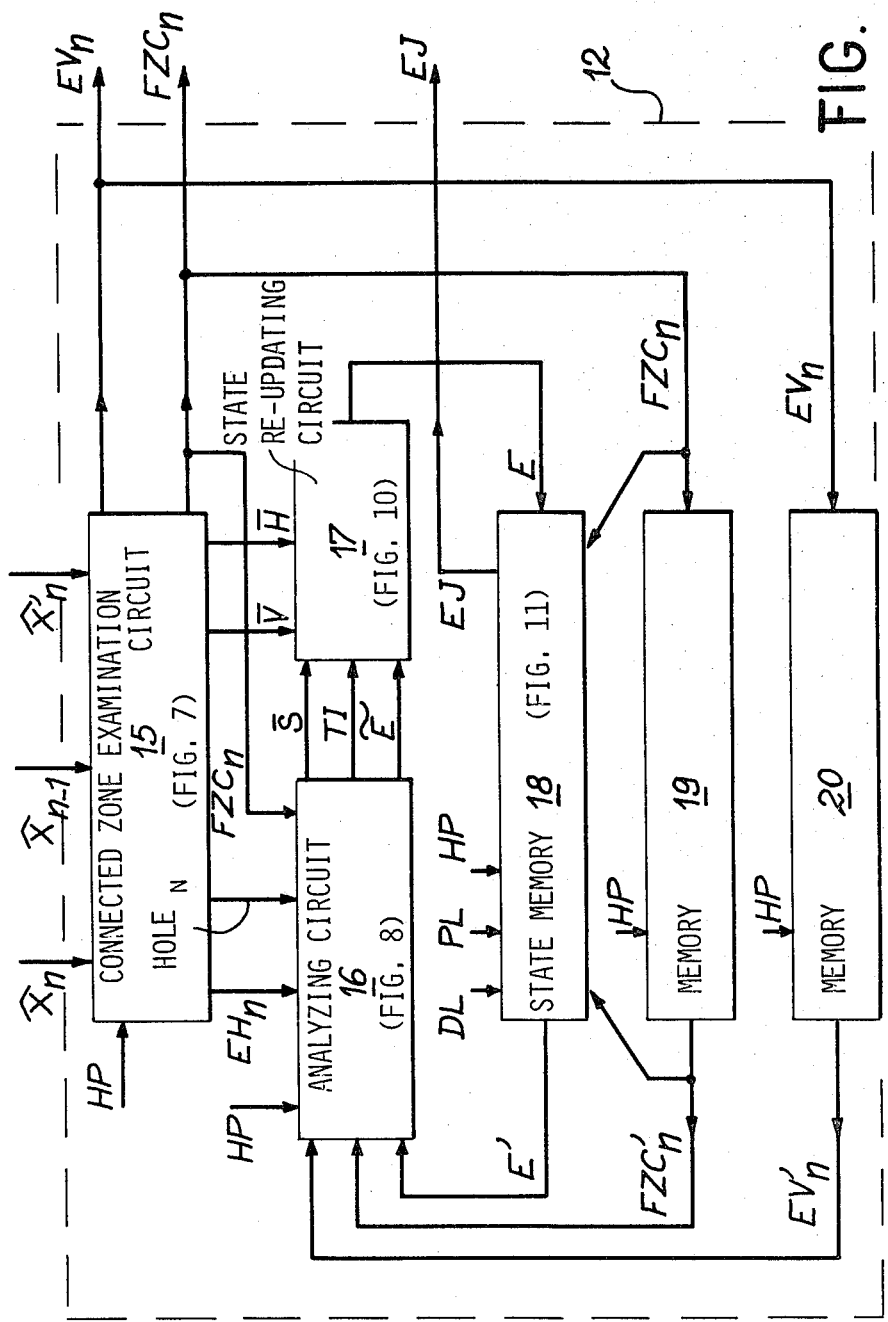
FIG. 6 a block diagram of the circuit for the observation and recursive estimation of the state.

The block diagram of FIG. 6 firstly represents the circuit 12 for the observation and recursive estimation of the state and which comprises:

(A) a connected zone examination circuit 15 incorporating:

means for the detection between two successive samples $\hat{X}_{n-1}$ and $\hat{X}_n$ of the same line the presence of absence of a variation in the value of the sample exceeding a certain threshold and for producing a signal corresponding to the vertical contour element $EV_n$, means for detecting between two samples $\hat{X}_n'$ and $\hat{X}_n$ of the same rank, but belonging to two adjacent lines, the presence or absence of a variation in the sample value exceeding a certain threshold and for producing a corresponding horizontal contour element signal $EH_n$, means for supplying a $HOLE_n$ signal in the case of the contour being absent at the point of rank n, means for counting the total number of horizontal contour elements and the total number of vertical contour elements examined along a line in each connected zone, said numbers being converted into signals $\overline{H}$ and $\overline{V}$, means for detecting the connected horizontal and vertical contour elements on a line and for detecting the groups of said connected elements, i.e. connected zones, said means being suitable for supplying a signal when a connected zone is terminated at the point of rank n, said signal being designated $FZC_n$, circuit 15 for examining the connected zones, which thus has three inputs receiving the samples $\hat{X}_n$, $\hat{X}_{n-1}$ and $\hat{X}_n'$ and six outputs respectively supplying the signals $EV_n$, $EH_n$, $\overline{V}$, $\overline{H}$, $FZC_n$, $HOLE_n$;

(B) a loop operating in a recursive manner and incorporating:

a first memory 18, called a state memory, receiving signals E and $FZC_n$ relative to the line being examined and an end of connected zone signal $FZC_n'$ for the preceding line, said memory supplying a state signal E' relative to the preceding line, as well as the state signal EJ relative to the point of rank $n-J$ of the line being examined;

a second memory 19 having N registers receiving the end of connected zone signal $FZC_n$ relative to the line being examined and supplying the signal $FZC_n'$ relative to the preceding line, a third memory 20 receiving the signal $EV_n$ and supplying a signal $EV_n'$ relative to the preceding line, a circuit 16 for analysing the connected zones between one line and the next, said circuit having six inputs respectively receiving the signals $EH_n$, $HOLE_n$ and $FZC_n$ from the connected zone of the observation circuit and E', $FZC_n'$ and $EV_n'$ from the three memories, said circuit having means for extracting from the six signals received, three signals useful for studying a connected zone and relative to that part of the preceding line in contact with the said connected zone, these three signals being respectively:

a signal $\overline{S}$ giving the orientation sign of the picture contour, as observed in the current line, a signal TI indicating the necessity of initializing the state at the start of the contour, a signal $\widetilde{E}$ relative to a prior equivalent state for the connected zone being examined in the case of observing a fork;

a state re-updating circuit 17 having five inputs respectively receiving the signals $\overline{H}$ and $\overline{V}$ from the connected zone examination circuit 15 and $\overline{S}$, TI and $\widetilde{E}$ from the circuit 16 for analysing the connected zones from one line to the next, and an output supplying a state signal E obtained either from the previous state $\widetilde{E}$ and more recent observations $\overline{S}$, $\overline{H}$ $\overline{V}$ or solely on the basis of the more recent observations $\overline{S}$, $\overline{H}$ and $\overline{V}$, this case being indicated by the signal TI.

Figure 7:
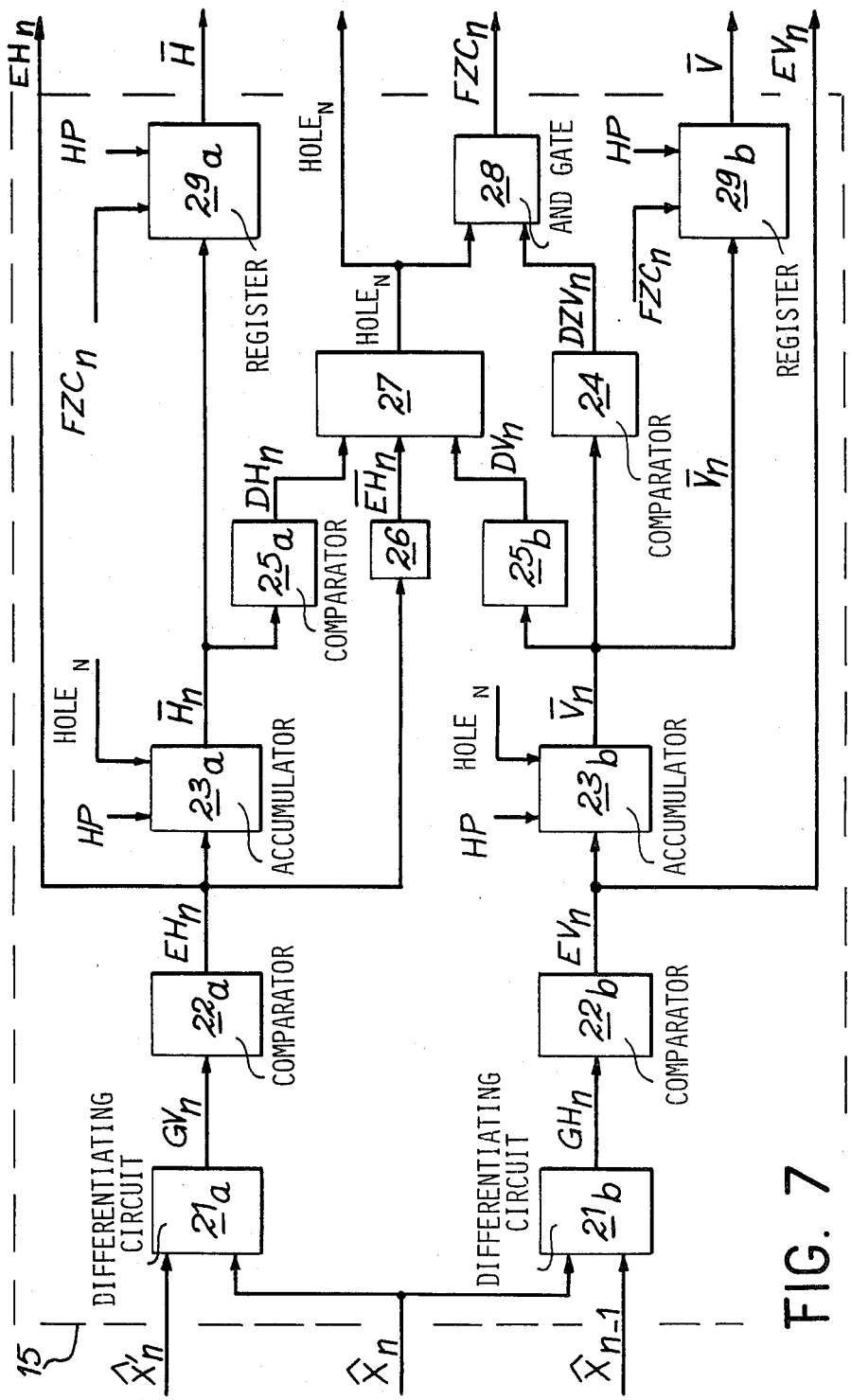
FIG. 7 a block diagram of the connected zone observation circuit.

FIG. 7 is the block diagram of the connected zone observation circuit 15, which comprises:

(A) a first channel for the processing of horizontal contour elements constituted by:

a first difference circuit 21a having two inputs receiving signals $\hat{X}_n'$ and $\hat{X}_n$ and an output supplying a vertical radiant signal $GV_n$, a first comparator 22a receiving the signal $GV_n$ and supplying the logic signal $EH_n$ representing a horizontal contour element, an output supplying signal $EH_n$, a first accumulator 23a receiving the signals $EH_n$ and counting them for supplying a signal $\overline{H}_n$ representing the number of vertical contour elements, said accumulator being zeroed by the $HOLE_n$ signal, a second comparator 25a which receives the signal $\overline{H}_n$ and compares it with a predetermined number and supplies an overshoot signal $DH_n$ when $\overline{H}_n$ exceeds said number, a first register 29a which loads the signal $\overline{H}_n$ and which is controlled by the signal $FZC_n$ and supplies the signal H representing the number of horizontal contour elements in the examined connected zone, an inverter 26 receiving $EH_n$ and supplying a complementary signal $\overline{EH}_n$;

(B) a second channel for processing the vertical contour elements constituted by:

a second difference circuit 21b having two inputs receiving the signals $\hat{X}_n$ and $\hat{X}_{n-1}$ and one output supplying a horizontal gradient signal $GH_n$, a second comparator 22b receiving the signals $GH_n$ and supplying the logic signal $EV_n$ representing a vertical contour element, an output supplying the said signal $EV_n$, a second accumulator 23b receiving the signals $EV_n$ and counting them to supply the signal $\overline{V}_n$ and representing the number of horizontal contour elements, said accumulator being actuated by the timing signal HP and zeroed by the $HOLE_n$ signal, a second comparator 25b which receives the signal $\overline{V}_n$, compared it with a predetermined number and supplies an overshoot signal $DV_n$ when $\overline{V}_n$ exceeds said number, a second register 29b which loads the signal $\overline{V}_n$ and which is controlled by the signals $FZC_n$ and supplies the signal $\overline{V}$, representing the number of vertical contour elements of the considered connected zone, a comparator 24 receiving the signal $\overline{V}_n$ and comparing said signal with 1 and supplying a signal $DZC_n$;

(C) a logic gate 27 of the OR type having three inputs respectively receiving the signal $DH_n$, $\overline{EH}_n$ and $DV_n$ and one output supplying the $HOLE_n$ signal;

(D) a logic gate 28 of the AND type having two inputs receiving the signals $HOLE_n$ and $DZV_n$ and one output supplying the signal $FZC_n$.

Figure 5:
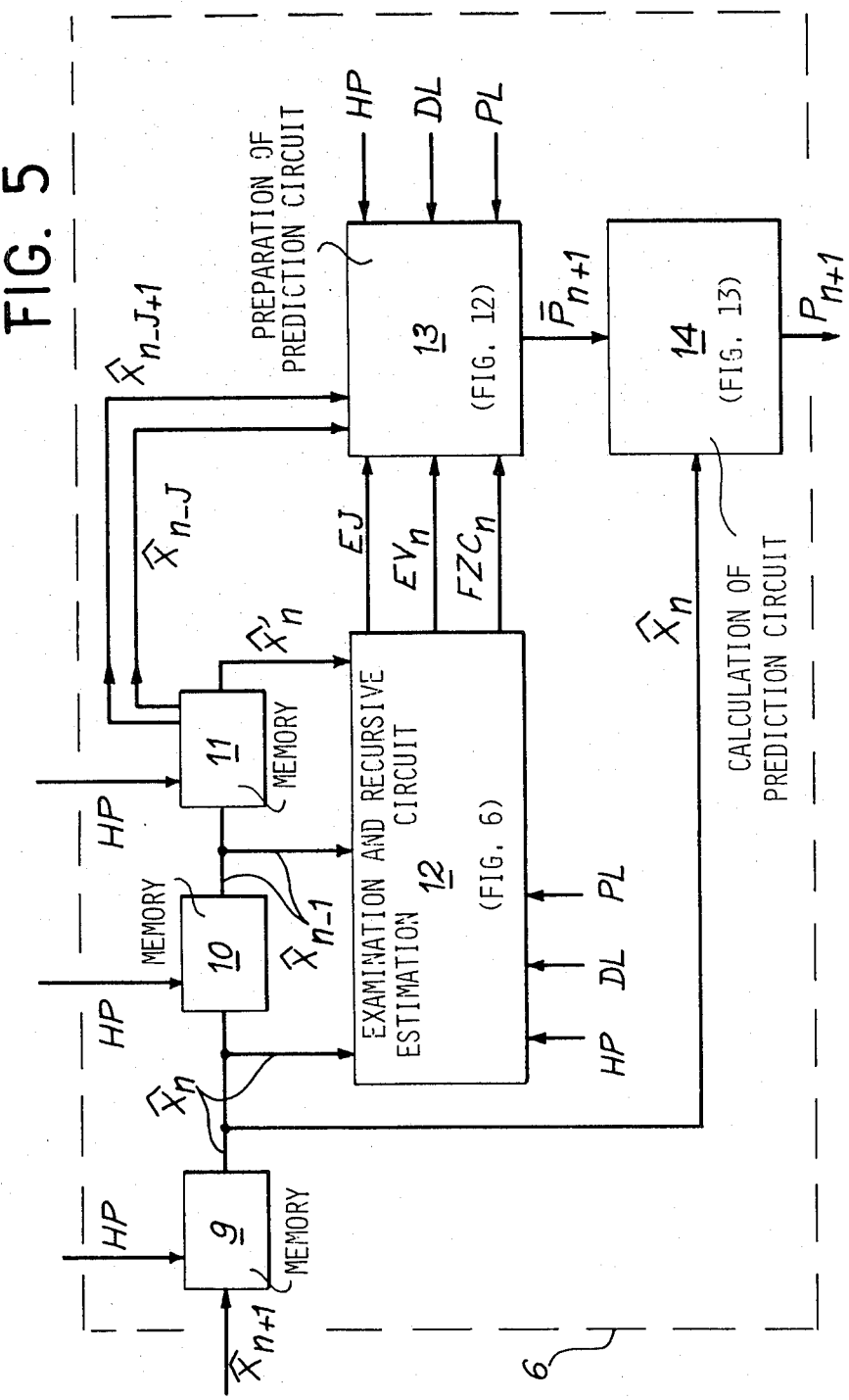
FIG. 5 a block diagram of the prediction circuit according to the invention.

In the present embodiment, the signals $\hat{X}_n$, $\hat{X}_n'$ and $\hat{X}_{n-1}$ come from memories 9, 10 and 11 of FIG. 5. The circuits 21a and 21b calculate the absolute value of the difference between their two inputs. Their outputs $GV_n$ and $GH_n$ are vertical and horizontal gradients coded by 8 bits. The circuits 22a and 22b are two comparators, whose respective logic outputs are at 1 if the gradients $GV_n$ and $GH_n$ respectively exceed two thresholds $\lambda_V$ and $\lambda_H$ which are fixed. The logic outputs $EH_n$ and $EV_n$ of these comparators, when they are at 1, thus indicate the presence of horizontal and vertical contour elements. These contour elements are counted for each rising front of HP in accumulators 23a and 23b and allow $HOLE_n$ as the zeroing signal. Thus, their outputs $\overline{H}_n$ and $\overline{V}_n$ (three bits are sufficient) count the number of horizontal and vertical elements during the observation of the processed connected zone. They are loaded into the registers 29a and 29b at the end of the connected zone ($FZC_n$ control) which supply the numbers $\overline{H}$ and $\overline{V}$ (three bits) of horizontal or vertical contour elements in the connected zone which has been examined. Circuit 24 is a comparator ($\geq 1$), whose output is the logic signal $DZV_n$ which is 1 if $\overline{V}_n \geq 1$ indicating the first vertical contour element in the connected zone. It passes to 0 again at the end of the connected zone due to the zeroing by $HOLE_n$ of accumulator 23b.

The signals $FZC_n$ and $HOLE_n$ are obtained in the following manner. The $HOLE_n$ signal serves to indicate the gaps between connected zones, no matter whether or not said connected zones have vertical contour elements. A connected zone is interrupted in the two following cases: if there is no longer any horizontal contour element which implies $EH_n=0$ or $\overline{EH}_n-1$ (output of inverter 26) or if it is found that the content of accumulators 23a and 23b strictly exceeds the value 6. The circuits 25a and 25b are comparators ($>7$) whose logic output $DH_n$ and $DV_n$ pass to 1 if $\overline{H}_n \geq 7$ and $\overline{V}_n \geq 7$ respectively. IF one of these three cases occurs, the connected zone is interrupted and is optionally divided up into a plurality of connected zones if it is too wide ($DH_n$ or $DV_n$ active). The reason for such a procedure is to prevent the risk of having connected zones with uncontrolled lengths, which would necessitate complex buffering operations, whereas the proposed solution offers few disadvantages and in practice an overflow only rarely occurs. Circuit 27 is an OR gate with three inputs, whose output $HOLE_n$ thus indicates a hole between connected zones and is an output of the circuit. Signal $DZV_n$ is, with $HOLE_n$, one of the two inputs of the logic AND gate 28, which supplies the logic signal $FZC_n$ indicated that the hole being detected by $HOLE_n$ immediately follows a connected zone allowing at least one vertical contour element. Thus, $FZC_n$ is an end of connected zone signal allowing one or more vertical contour elements (these are the connected zones for which it is necessary to carry out a re-updating or initialization of state). The signal $FZC_n$ appears at the circuit output.

Obviously, each use of one of the two control signals $HOLE_n$ or $FZC_n$ requires an appropriate regulation of the delays of clock point HP, e.g. in FIG. 7 the writing control signals $FZC_n$ of registers 29a and 29b must act before the zeroing control signals ($HOLE_n$) of accumulators 23a and 23b.

For a line being processed, Table I describes the development of the various signals during the observation of four connected zones, whereof one (the first) is not considered because it has no vertical contour elements and another (the third) is too long and is therefore subdivided. The signals $\overline{H}$ and $\overline{V}$ are only indicated at the end of the connected zone.

Figure 8:
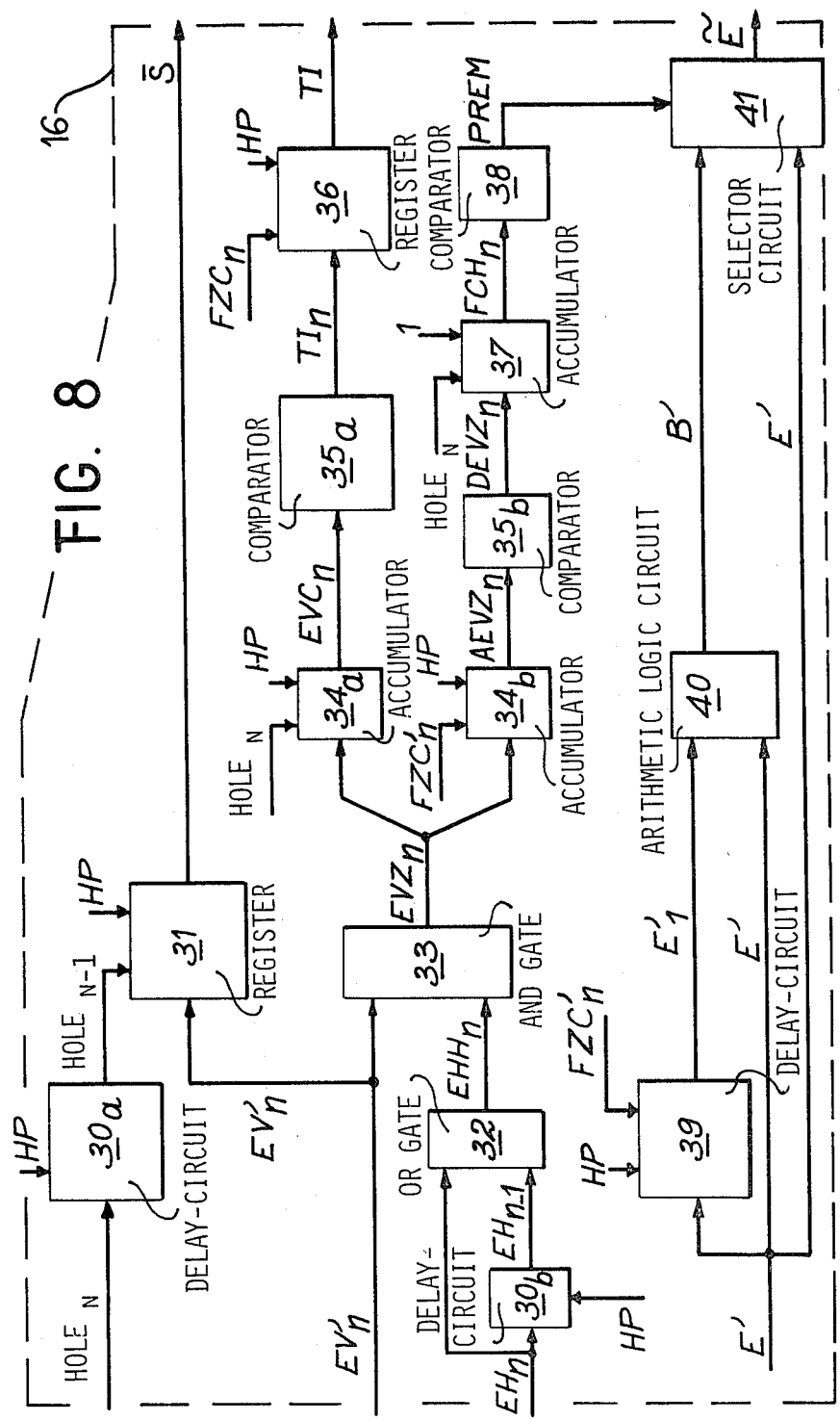
FIG. 8 a block diagram of the circuit for analysing the connected zones from one line to the next.

The circuit 16 for the analysis of the connected zones from one line to the next is indicated in FIG. 8 and comprises:

- a first delay circuit 30a with an input receiving the $HOLE_n$ signal and an output supplying a delayed $HOLE_{n-1}$ signal;
- a register 31 with a signal input receiving the signal $EV_n'$ and a control input receiving the signal $HOLE_{n-1}$ and an output supplying the signal $\overline{S}$;
- a second delay circuit 30b actuated by the timing signal HP having an input receiving the signal $EH_n$ and an output delivering a signal $EH_{n-1}$;
- a logic OR gate 32 having two inputs receiving the signals $EH_{n-1}$ and $EH_n$ and one output supplying a signal $EHN_n$;
- a logic AND gate 33 having two inputs receiving the signals $EHN_n$ and $EV_n'$ and one output supplying a signal $EVZ_n$;
- a first processing channel for signal $EVZ_n$ incorporating:
  (i) a first accumulator 34a having a zeroing input receiving the $HOLE_n$ signal, a signal input receiving $EVZ_n$ and an output supplying signal $EVC_n$,
  (ii) a first comparator 35a relative to 1 having an input receiving $EVC_n$ and an output supplying a signal $TI_n$,
  (iii) a register 36 having a writing input receiving the signal $FZC_n$, a signal input receiving $TI_n$ and an output supplying an initialization required signal TI;
- a second processing channel for signal $EVZ_n$ incorporating;
  (i) a second accumulator 34b having a zeroing input receiving the signal $FZC'$, a signal input receiving $EVZ_n$ and an output supplying a signal $AEVZ_n$,
  (ii) a second comparator 35b relative to 1 having an input receiving $AEVZ_n$ and an output delivering a signal $DEVZ_n$,
  (iii) an accumulator 37 having a zeroing input receiving the signal $HOLE_n$ and an authorisation input receiving the signal $DEVZ_n$, a signal input receiving a signal 1 and an output supplying a signal $FCH_n$,
  (iiii) a comparator 38 relative to 1 having an input receiving the signal $FCH_n$ and an output supplying a control signal PREM;
- a delay circuit 39 having a zeroing input receiving $FZC_n'$ a signal input receiving the state signal $E'$ and an output supplying a state signal $E_1'$;
- an arithmetic and logic circuit 40 having two inputs, one receiving $E_1'$ and the other $E'$ and an output supplying a signal $B'$ for weighting signals $E_1'$ and $E'$;
- finally, a selector circuit 41 having a control input receiving the signal PREM, two inputs receiving the signals $B'$ and $E'$ and an output supplying the equivalent state signal $\widetilde{E}$ in the presence of a fork.

The function of the circuit 16 for analysing connected zones from one line to the next is to extract from the data useful for studying a connected zone that relating to the part of the preceding line in contact with the said connected zone. The three items of data correspond to the three outputs of the circuit: $\overline{S}$, TI, $\widetilde{E}$.

Signal $\overline{S}$ gives the information relating to the orientation of the contour (cf FIG. 1c): $\overline{S}=1$ if $\theta \geq 0$, $S=0$ if $\theta<0$. If signals, available under the action of $HOLE_{n-1}$, supplied from the $HOLE_n$ signal by the time lag 30a, is supplied at each point immediately following a point not located in a connected zone, but only has the requisite significance during the start of a connected zone (cf Table IIa), i.e. the only time where it will subsequently be effectively used (indicated by * in Table IIa).

Signal TI indicates the necessity of an initialization. For the connected zone being processed (zeroing by $HOLE_n$) accumulator 34a counts the vertical contour elements $EV_n'$ located immediately above the connected zone being processed, ends included (whence the presence of $EH_{n-1}$), whilst the signal TI (inscription of $TI_n$ at the end of the connected zone), indicates by its value 1 that the said accumulator is empty.

Figure 9:
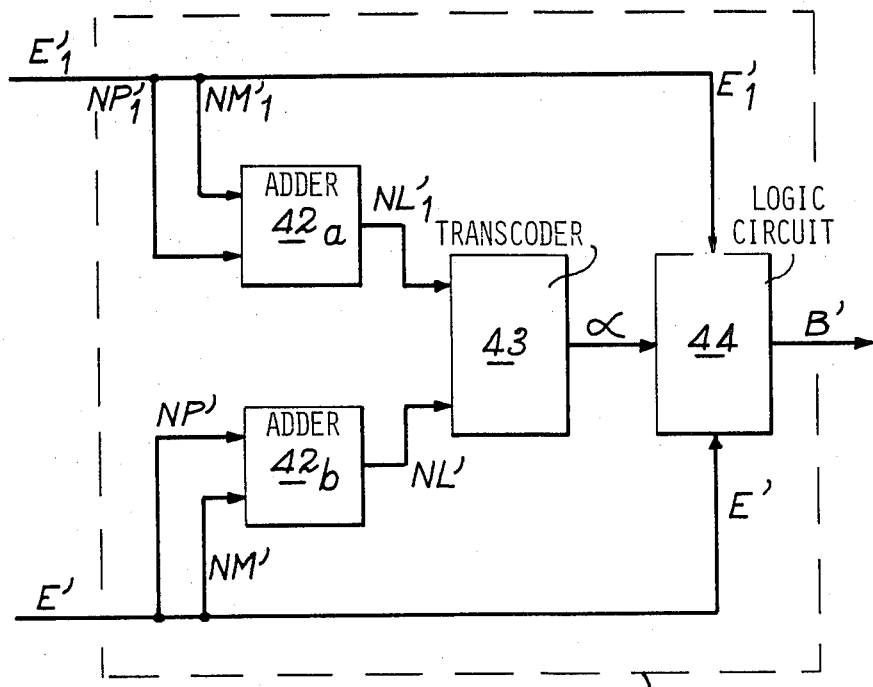
FIG. 9 a block diagram of the circuit for calculating the barycentric coordinates of the states.

Signal $\widetilde{E}$ constitutes the equivalent state in the presence of a fork, i.e. a situation where two different connected zones of the preceding line are both connected to the same connected zone during the processing thereof (cf Table IIb) in which case the circuit 40 forms a "barycentric" calculation, whose result is $B'$, from the states of the last two connected zones $E'$ and $E_1'$ of the preceding line connected to the connected zone being processed (this circuit will be described relative to FIG. 9). If a fork with three or more branches is present, only the two latter are used for the present operation. The presence of a fork is detected by the control signal PREM of the selector 41 ($\widetilde{E}=E'$ if PREM=1, $\widetilde{E}=B'$ if PREM=0) which is produced in the following manner: signal $AEVZ_n$ counts the vertical contour elements relative to a connected zone of the preceding line (whence the zeroing by $FZC_n'$) and connected to the connected zone being processed. The output of comparator 35b (≧1) contains the information necessary for the detection of the first instance where AEVZ$_n$ is no longer zero. The state of signal DEVZ$_n$ authorises clock HP to accumulate the input of value 1 in accumulator 37, whereof the output FCH$_n$ counts (Table IIb) the number of branches in the fork. Finally, comparator 38 imposes PREM=1 if FCH$_n$≦1.

The barycentric coordinate circuit 40 introduced in FIG. 8 is shown in detail in FIG. 9. It comprises two adder circuits 42a and 42b, whereof the respective inputs carries signals NP$_1'$ and NM$_1'$ collecting certain bits of the state signal E$_1'$ on the one hand and signals NP' and NM' extracted from the state signal E' on the other. The outputs of the two circuits 42a and 42b are inputs of a transcoder circuit 43, whose output is an input of the arithmetic and logic circuit 44, whose output carries the signal B' and whose other inputs carry the signals E' and E$_1'$.

The adders 42a and 42b supply the approximate lengths NL'=NM'+NP' and NL$_1'$=NM$_1'$+NP$_1'$ of the two contours constituting the fork. The output α of circuit 43 is a weighting coefficient taking account of the relative length of the two contours.

Tables IIIa and IIIb give two variants of correspondence between NL$_1'$, NL' and α. Table IIIa constitutes the first variant and Table IIIb complements Table IIIa in the case of the second variant by explaining the case, NL'≧1, NL$_1'$≧1 of Table IIIa.

Table IV indicates the nomenclature of the components of the different state vectors used (E, EJ, E', E$_1'$, B', $\widetilde{E}$, EE, EI) with their enumeration.

Table V gives the correspondence between states E' and E$_1'$ and the equivalent state by barycentering B'. In this Table, symbols S' and S$_1'$ are to be interpreted in the form ±1 (−1 if the bit is at 0, +1 if the bit is at 1), this convention applying to all the formulas used in the Tables.

Figure 10:
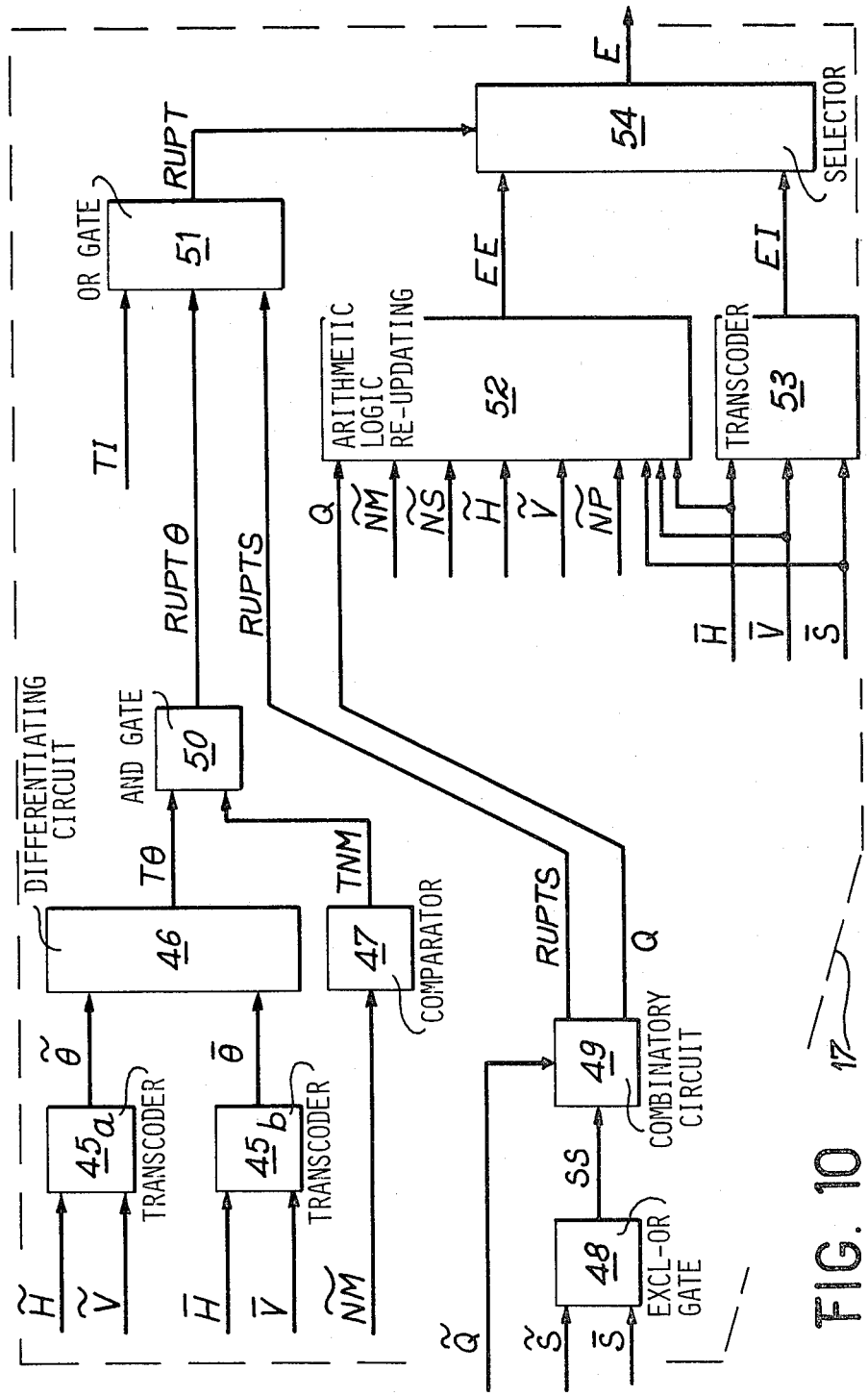
FIG. 10 a block diagram of the circuit for re-updating the states.

FIG. 10 represents the "re-updating of the local state" circuit 17 introduced in FIG. 6 and which comprises:

- a first transcoder 45a with two inputs receiving horizontal and vertical contour element signals $\widetilde{H}$ and $\widetilde{V}$ extracted from the state signal $\widetilde{E}$ and with one output supplying a signal $\widetilde{\theta}$ corresponding to the absolute value of a previous contour orientation angle;
- a second transcoder 45b with two inputs receiving the horizontal and vertical contour element signals $\overline{H}$ and $\overline{V}$ from circuit 15 and having an output supplying a signal $\overline{\theta}$ corresponding to the absolute value of an examinder contour orientation angle;
- a differentiating circuit with a threshold 46 having two inputs receiving the signals $\widetilde{\theta}$ and $\overline{\theta}$ and one output supplying a signal T$\theta$;
- a comparator circuit 47 relative to 2 having an input receiving a signal N$\widetilde{M}$ extracted from the state signal $\widetilde{E}$ and representing the number of operations of the contour and with an output supplying aisignal TNM;
- a logic AND gate 50 having two inputs respectively receiving the signals T$\theta$ and TNM and an output supplying the signal RUPT$\theta$;
- a logic EXCLUSIVE-OR gate 48 with two inputs respectively receiving the signal $\widetilde{S}$ extracted from the state signal $\widetilde{E}$ and the signal $\overline{S}$ from the line by line analysis circuit and an output supplying a signal SS;
- a combinatory circuit 49 with two inputs respectively receiving a signal $\widetilde{S}$ extracted from signal $\widetilde{E}$ and signal SS and two outputs, one supplying a signal RUPTS and the other a signal Q;
- a logic OR circuit 51 with three inputs respectively receiving the signal TI, the signal RUPT$\theta$ and the signal RUPTS and one output supplying a signal RUPT;
- an arithmetic and logic state re-updating circuit 52 with 9 inputs respectively receiving the signal Q and the signals coming from $\widetilde{E}$, namely N$\widetilde{M}$, N$\widetilde{S}$, $\widetilde{H}$, $\widetilde{V}$, N$\widetilde{P}$, as well as the observations signals $\overline{H}$, $\overline{V}$ and $\overline{S}$ and one output supplying a re-updating signal EE;
- a transcoder 53 with three inputs respectively receiving the signals $\overline{H}$, $\overline{V}$ and $\overline{S}$ and with one output supplying an initialized state signal EI;
- a selector 54 with two inputs receiving the signals EE and EI and one control input receiving the signal RUPT and an output supplying the signal E.

The circuits 55a and 55b can be two identical programmable memories which on the basis of $\overline{H}$ and $\overline{V}$ respectively $\widetilde{H}$ and $\widetilde{V}$, supply $\widetilde{\theta}$ or $\overline{\theta}$. These two angles measure in absolute values the previous angle and the angle observed, expressed with three bits in the example of Table VIa and VIb, which are two variants of the conversion giving $\theta$ from H and V.

Circuit 46 performs the test $|\widetilde{\theta}-\overline{\theta}|\geq\Delta\theta$, in which $\Delta\theta$ is a fixed threshold. Circuit 47 is a comparator (≧2), whose output is TNM (TNM=1 if N$\widetilde{M}$≧2). The output of the logic AND gate 50 is the signal RUPT$\theta$, which does not take account of the interruption on the absolute value of $\theta$, except when the contour length observed is adequate. The signal SS from the exclusive OR gate 48 is processed with signal Q by combinatory circuit 49 having two inputs and two outputs, whereof the correspondence table is described in Table VII.

The output RUPTS indicates an interruption on change of sign persisting over at least two successive lines.

The signals RUPTS, RUPT$\theta$ and TI are combined by the logic OR gate 51. The signal RUPT (interruption) which results is that which effects the choice E=EI (initialized state) in the selector 54 when RUPT=1. The arithmetic and logic circuit 52 has for inputs the content of $\widetilde{E}$ and Q, having nevertheless being replaced by Q and the three observations $\overline{H}$, $\overline{V}$ and $\overline{S}$. It reupdates the state in accordance with the formulas indicated in Tables VIII and IX and at the output supplies the signal EE (reestimated state). Finally, the signal EI is the output of the transcoder circuit 53 which performs, in accordance with the information of Table IX, the loading of EI on the basis of observations $\overline{H}$, $\overline{V}$ and $\overline{S}$. In Table IX, sign S is to be interpreted in the form of ±1 and not by 0 or 1.

Figure 11:
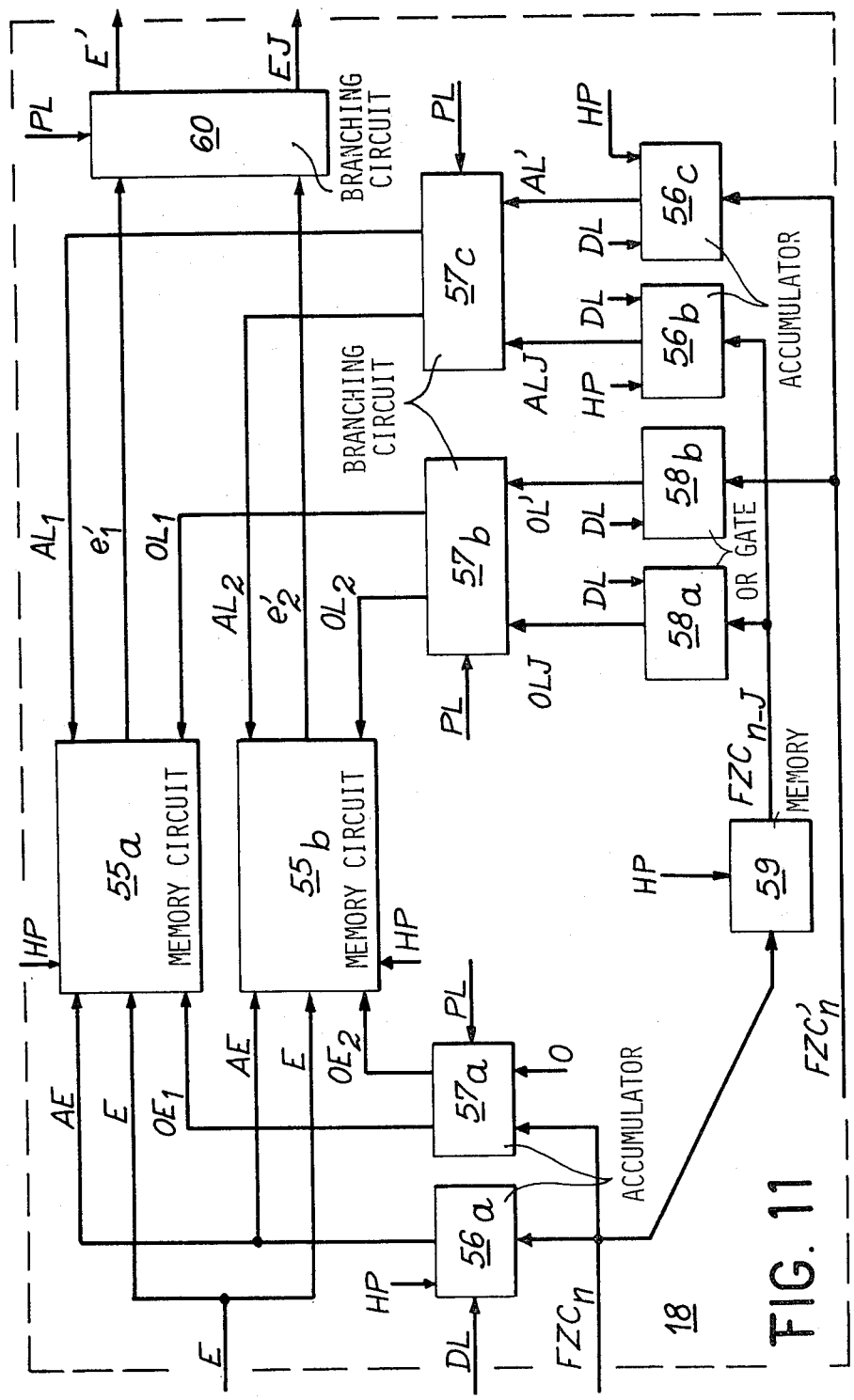
FIG. 11 a block diagram of the state memory circuit.

The block diagram of FIG. 11 represents the state memory 18 mentioned in FIG. 6. The input FZC$_n$ is connected on the one hand to the inputs of accumulator circuits 56a and 57a and on the other to the input of the memory circuit 59 actuated by HP. Circuit 56a, actuated by HP and zeroed by the start of line signal DL has its output connected to the first input of the two memory circuits 55a and 55b actuated by HP. Besides the input FZC$_n$, circuit 57a admits the line parity signal PL and its outputs are respectively connected to the third input of circuit 55a and to the third input of circuit 55b. The output of circuit 59 is connected to the first input of the two logic OR circuits 58a and accumulator 56b, whose other input is the signal DL. Their outputs are respectively connected to the first input of branching circuits 57b and 57c. The input signal $FZC_n'$ is connected to the input of the logic OR gates 58b and accumulator 56c actuated by HP and zeroed by DL. The outputs of these two circuits are respectively connected to the second inputs of circuits 57b and 57c. The outputs of circuit 57b are connected to the fourth inputs of circuits 55a and 55b. The outputs of circuit 57c are connected to the fifth inputs of circuits 55a and 55b. The input E is connected to the second inputs of circuits 55a and 55b. The outputs of these two circuits are connected to the inputs of the branching circuits 60 controlled by PL, whose outputs carry the signals E' and EJ.

The state memory is constituted by two direct access memories (RAM) 55a and 55b relating to the present or current lines and the preceding line. The switching at each change of line takes place at the branches 57a, b, c and 60 under the action of the control PL (0 or 1) indicating the parity of the line, in accordance with the information given in Table X. Signal AE is a writing address from accumulator 56a (zeroing by the line start control signal DL) incremented by the control signal $FZC_n$ indicating the end of a connected zone. In the same way, the writing commands $OE_1$ and $OE_2$ are obtained at the output of branch 57a controlled by PL, whose two inputs are $FZC_n$ and 0. Writing only takes place in the one out of the two memories relating to the current line (Table X). The states are read on the one hand for the preceding line (state E') and on the other hand for the current line (state EJ) for a connected zone in the current line optionally at point n−J (n being the current point, J being a fixed integer defined at the end of the description of FIG. 12). The reading controls for the preceding line are therefore obtained at the output OL' of the logic OR gate 58b, whose second input is DL (control signal indicating the start of a line). A first reading is carried out at the start of the line, then the signal FZC' indicates that the connected zone relative to state E' which has just been read is terminated and it is therefore necessary to give a further reading command. The reading command of the state memory relative to the current line, with a delay J ensuring that a possible state for a connected zone terminating at point n has been completely calculated when the point n−J arrives (the connected zones have a width ≦J, cf FIG. 7 and Table I) is obtained at the output OLJ of the logic OR gate 58a having two input admitting FZC−J (output of circuit 59 delaying $FZC_n$ by J points) and DL as inputs, whereby OLJ acts in exactly the same way as OL'. The reading commands are branched at 57b under the action of the line parity control PL (cf Table X). The sense addresses AL' and ALJ relative respectively to the preceding line (sense of E') and the current line with a delay of J (sense of EJ) are obtained, in accordance with the same principle as hereinbefore, at the output of accumulators 56b and 56c, whose respective inputs receive $FZC_n'$ and $FZC_{n-J}$ and whose zeroing control is DL. The branching of these addresses takes place at 57c under the effect of signal DL (Table X). On return, the same signal PL controls the branching circuit 60 (Table X) which, having as its inputs the outputs $e_1'$ and $e_2'$ of the two RAM memories 55a and 55b supplies at its first output E' and at its second output EJ (Table X). Table X indicates the assignments for branching circuits 57a, b, c and 60.

Figure 12:
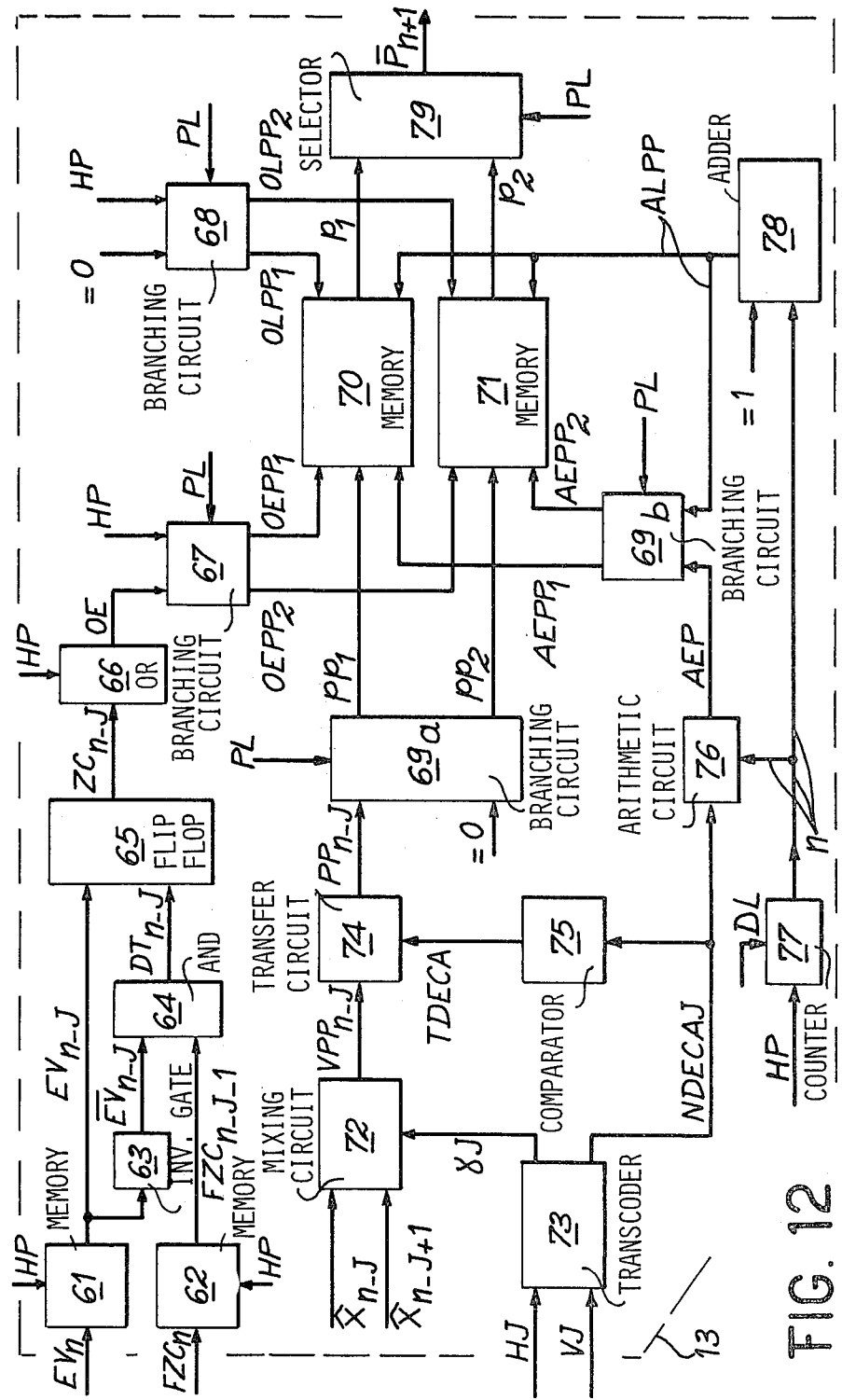
FIG. 12 a block diagram of the circuit for the preparation and storage of the predictions.

Circuit 13 for the preparation and storage of the prediction is illustrated in FIG. 12 and comprises:
a first memory 61 having an input receiving the signal $EV_n$ and an output supplying a delayed signal $EV_{n-J}$;
an inverting gate 63 having an input receiving $EV_{n-J}$ and supplying a complementary signal $\overline{EV}_{n-J}$;
a second memory 62 having an input receiving the signal $FZC_n$ and an output supplying a delayed signal $FZC_{n-J-1}$;
a logic AND gate 64 having two inputs respectively receiving the signals $\overline{EV}_{n-J}$ and $FCZ_{n-J-1}$ and an output supplying $DT_{n-J}$;
a flip-flop 65 with two inputs respectively receiving the signals $EV_{n-J}$ and $DT_{n-J}$ and an output supplying a signal $ZC_{n-J}$;
a logic OR gate 66 having two inputs, one receiving the timing signal HP and the other the signal $ZC_{n-J}$ and an outer supplying a signal OE;
a branching circuit 67 with two inputs receiving in one case the timing signal HP and in the other the signal OE, a control input receiving the signal PL and two outputs respectively supplying a signal $OEPP_1$ and a signal $OEPP_2$;
a branching circuit 68 with two inputs respectively receiving the timing signal and a signal 0 of value zero a control input receiving the service signal PL and two outputs respectively supplying the signals $OLPP_1$ and $OLPP_2$;
a transcoder circuit 73 with two inputs respectively receiving the signals HJ and VJ extracted from the state signal EJ and two outputs respectively supplying a signal y J and a signal NDECAJ;
a comparator 75 relative to a number at the most equal to J with an input receiving the signal NDECAJ and an output supplying the circuit TDECA;
a counter 77 with a zeroing input receiving the service signal DL and an input receiving the timing signal HP and an output supplying a signal n;
an arithmetic circuit 76 with two inputs respectively receiving the signal NDECAJ and n and an output supplying the signal AEP corresponding to n−J+NDECAJ;
an adder 78 with two inputs, one receiving the number n and the other the number 1 and an output supplying the signal ALPP corresponding to n+1;
a first branching circuit 69a with two inputs respectively receiving the signal $PP_{n-J}$ and a zero signal 0 and a control input receiving the service signal PL and two outputs respectively supplying the signals $PP_1$ and $PP_2$;
a second branching circuit 69b with two inputs respectively receiving the signals ALPP and AEP, a control input receiving the service signal PL and two outputs respectively supplying the signals $AEPP_1$ and $AEPP_2$;
a first random access memory 70 with five inputs respectively receiving the signals $OEPP_1$, $OLPP_1$, $AEPP_1$, ALPP and $pp_1$ and an output supplying a signal $p_1$;
a second random access memory RAM 71 with five inputs respectively receiving the signals $OEPP_2$, $OLPP_2$, $AEPP_2$, ALPP and $pp_2$ and an output supplying a signal $p_2$;
a selector 79 with two inputs respectively receiving the signals $p_1$ and $p_2$ and an output supplying a prepared prediction signal $\overline{P}_{n+1}$.

Signal $EV_n$ is stored in circuit 61 actuated by HP for J cycles of HP. Signal $FZC_n$ is stored in circuit 62 actuated by HP for J+1 cycles of HP. Signal $EV_{n-J}$ sets the flip-flop 65 to 1 on its rising fronts and is also inverted by circuit 63. Signal $DT_{n-J}$ is the result of a logic AND gate of signals $FZC_{n-J-1}$ and $\overline{EV}_{n-J}$. By means of circuit 64, it sets the flip-flop 65 to 0 on its rising fronts. The output of flip-flop $ZC_{n-J}$ indicates when it is at 1 that the point n−J is in a connected zone between the first vertical contour element and the end of the zone, terminals included. Circuits 67, 68, 68a, 69b and 79 make it possible to control the writing and reading operations, indicate the writing and reading addresses, enter the values to be written and select the outputs of the RAM memory circuits 70 and 71 which store on one line the value $PP_{n-J}$ or the value 0 on one line.

The operation of the circuits 70 and 71 is reversed at each line and the various signals necessary for this operation are switched in accordance with Table XI.

The writing order OE is obtained by a logic AND gate for the signal $ZC_{n-J}$ and HP and it controls the writing of $PP_{n-J}$ at address AEP.

Figure 1A:
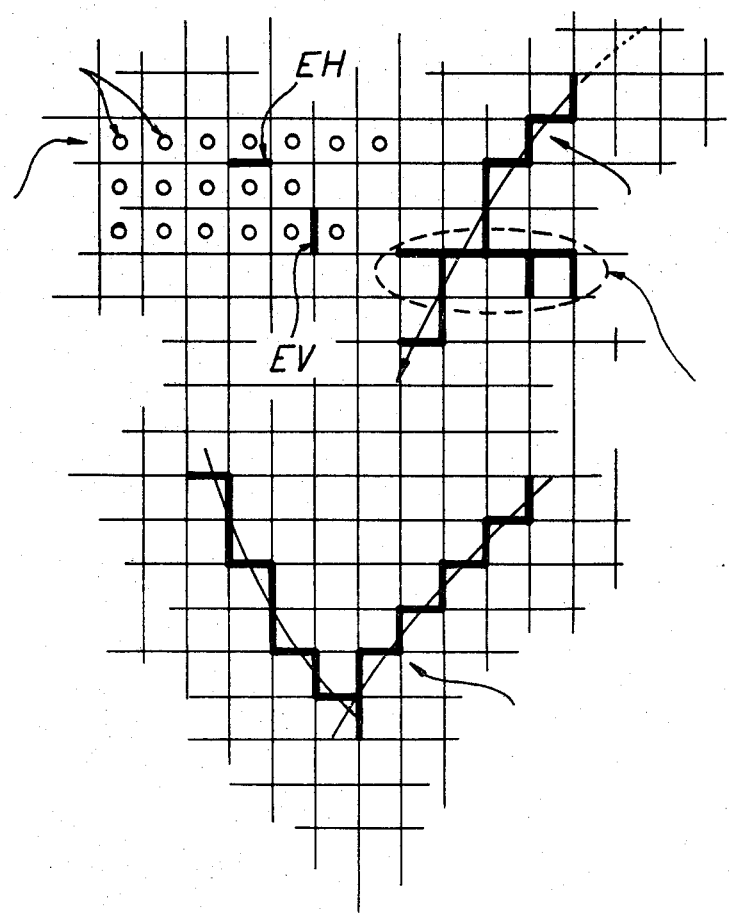
FIGS. 1a, 1b, 1c the notations and terminology used
Figure 1B:
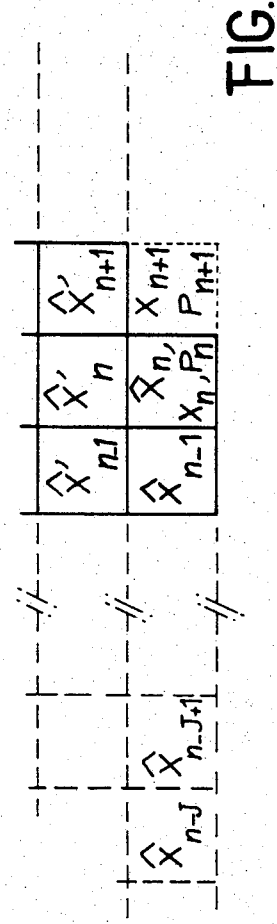
Figure 1C:
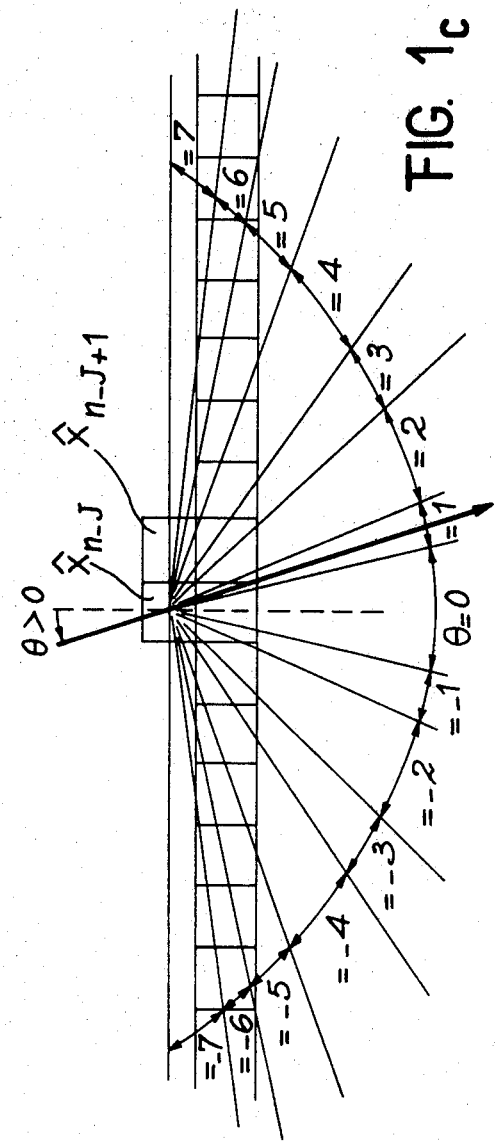

On assuming P1 equals 1 it is then the memory 70 which functions according to this mode ($OEPP_1 = OE$, $pp_1 = PP_{n-J}$), the writing address is $AEPP_1 = AEP$ which, due to the arithmetic circuit 76 equals n−J+NDECAJ, n being the sign of the point counted in circuit 77 which is reset to zero at the start of the line, J being a fixed integer which will be defined hereinafter and NDECAJ being a complete displacement which is a direct function of the estimated angle of the contour observed at point n−J (cf FIG. 1c). NDECAJ, like γJ is obtained by transcoding signals HJ, VJ and SJ from the state EJ due to the circuit containing a programmable memory 74 and in accordance with the information supplied in Table XII in the present example. The indicated angle θJ is obtained from HJ and VJ in the same way as in Tables VIa and b which are two variants. It sign is SJ. It is not necessary to produce θJ in circuit 73.

In the example where PL=1, memory 71 operates in accordance with a reading—writing mode in such a way that for each "strike" of clock HP ($OLPP_2 = HP$, circuit 68) memory 71 is read at address ALPP (=n+1 due to adder 78), selector 79 supplies the result of this reading ($\overline{P}_{n+1} = pp_2$). Immediately after the reading has taken place, the content of memory 71 is rest to zero by entering in it the value 0 ($pp_2 = 0$, circuit 79a) at the same address ($AEPP_2 = ALPP$, circuit 69b). The writing clock $OEPP_2$ necessary for this operation is then HP, the input of circuit 67, which is delayed sufficiently to intervene after the end of the reading cycle which supplies $P_{n+1}$. Thus, the RAM memory 70, 71 must authorise a reading cycle and then a writing cycle during one cycle of clock HP. When PL=0, the operation of the two memories 70 and 71 is reversed. Finally, the mixing circuit 72 supplies from its inputs $\hat{X}_{n-J}$ and $\hat{X}_{n-J+1}$, the signal $VPP_{n-J}$ which is equal to $(1-\gamma J)$ in the present embodiment, γJ assuming the numerical values 0, ¼, ½, or ¾ in accordance with the information of Table XII (circuit 73). The time displacement signal NDECAJ enters the comparator 75 (=7) which supplies a signal TDECA=1 if NDECAJ=7, if not TDECA=0. The function of circuit 74 is to transform $VPP_{n-J}$ by imposing the value of $PP_{n-J}$ at 0.1 or $VPP_{n-J}$ according to the information in Table XIII.

In the present embodiment, the connected zones have at the most 7 points and therefore J must be at least equal to 7. However, according to the frequency of HP and the speed of the circuits used, J could be greater than 7, but sufficiently below the line blanking time in order not to disturb the operation of the state memory (FIG. 1).

Figure 13:
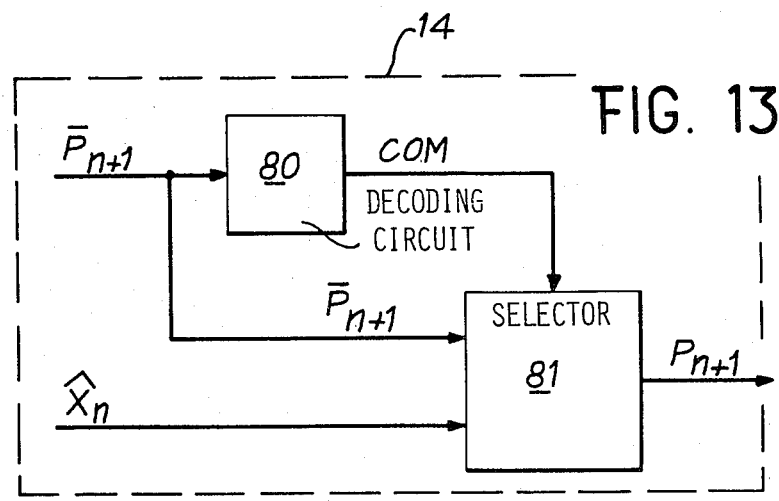
FIG. 13 a block diagram of the circuit for the final calculation of the prediction.

The circuit for the final calculation of the prediction is shown in FIG. 13 and comprises:

- a decoding circuit 80 with an input receiving the signal $\overline{P}_{n+1}$, the said circuit detecting the disappearance of $\overline{P}_{n+1}$ and having an output supplying a signal COM;
- a selector 81 with two inputs respectively receiving the signals $\overline{P}_{n+1}$ and $\hat{X}_n$, a control input receiving the signal COM and an output supplying the signal $P_{n+1}$.

The function of the coding circuit 80 is to detect the disappearance of $\overline{P}_{n+1}$. If $\overline{P}_{n+1} = 0$, the circuit output signal COM passes to 1 and then acts on selector 81 by imposing $P_{n+1} = \hat{X}_n$. If $\overline{P}_{n+1} \neq 0$ signal COM has the logic value 0 and selector 81 then imposes $P_{n+1} = \overline{P}_{n+1}$ for the prediction.

TABLE I

| Line $X_n$ | | | | | | | | | | | | | | | | | | | |
|---|---|---|---|---|---|---|---|---|---|---|---|---|---|---|---|---|---|---|---|
| $EH_n$ | 0 | 1 | 1 | 0 | 1 | 1 | 0 | 0 | 1 | 1 | 1 | 1 | 1 | 1 | 1 | 1 | 0 | 0 | 0 |
| $EV_n$ | 0 | 0 | 0 | 0 | 0 | 1 | 1 | 0 | 0 | 0 | 0 | 0 | 0 | 1 | 1 | 0 | 1 | 1 | 0 |
| $H_n$ | 0 | 1 | 2 | 2,0 | 1 | 2 | 2,0 | 1 | 1 | 2 | 3 | 4 | 5 | 6 | 7,0 | 1 | 2 | 2,0 | 0 | 0 |
| $V_n$ | 0 | 0 | 0 | 0 | 0 | 1 | 2,0 | 0 | 0 | 0 | 0 | 0 | 0 | 1 | 2,0 | 0 | 1 | 2,0 | 1,0 | 0 |
| $HOLE_n$ | 1 | 0 | 0 | 1 | 0 | 0 | 1 | 1 | 0 | 0 | 0 | 0 | 0 | 0 | 1 | 0 | 0 | 1 | 1 | 1 |
| $FZC_n$ | 0 | 0 | 0 | 0 | 0 | 0 | 1 | 0 | 0 | 0 | 0 | 0 | 0 | 0 | 1 | 0 | 0 | 1 | 1 | 0 |
| H | | | | | | | 2 | | | | | | | | 7 | | | 2 | 0 | |
| V | | | | | | | 2 | | | | | | | | 2 | | | 2 | 1 | |

TABLE IIa

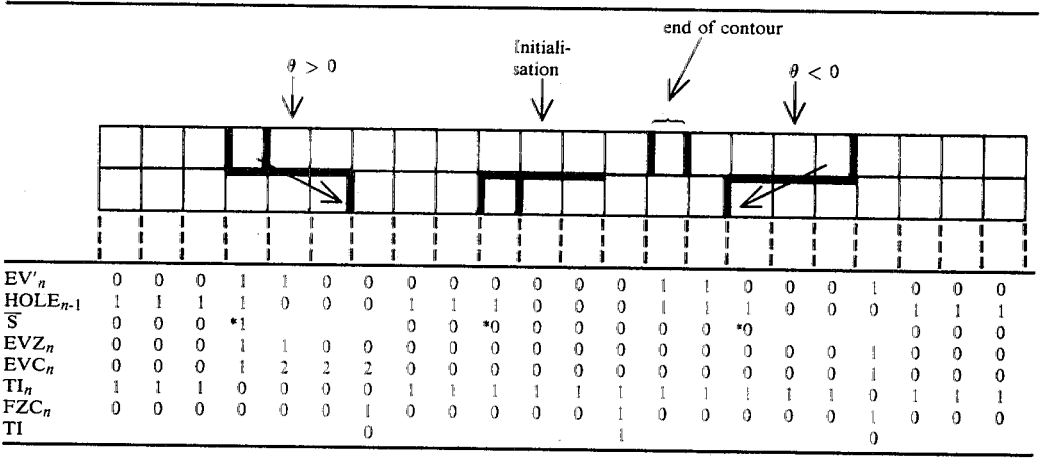

| | | | | | | | | | | | | | | | | | | | | | |
|---|---|---|---|---|---|---|---|---|---|---|---|---|---|---|---|---|---|---|---|---|---|
| $EV'_n$ | 0 | 0 | 0 | 1 | 1 | 0 | 0 | 0 | 0 | 0 | 0 | 0 | 0 | 1 | 1 | 0 | 0 | 0 | 1 | 0 | 0 | 0 |
| $HOLE_{n-1}$ | 1 | 1 | 1 | 1 | 0 | 0 | 0 | 1 | 1 | 1 | 0 | 0 | 0 | 1 | 1 | 1 | 0 | 0 | 0 | 1 | 1 | 1 |
| $\overline{S}$ | 0 | 0 | 0 | *1 | | | 0 | 0 | *0 | 0 | 0 | 0 | 0 | 0 | *0 | | | 0 | 0 | 0 |
| $EVZ_n$ | 0 | 0 | 0 | 1 | 0 | 0 | 0 | 0 | 0 | 0 | 0 | 0 | 0 | 0 | 0 | 0 | 0 | 0 | 1 | 0 | 0 | 0 |
| $EVC_n$ | 0 | 0 | 0 | 1 | 2 | 2 | 2 | 0 | 0 | 0 | 0 | 0 | 0 | 0 | 0 | 0 | 0 | 0 | 1 | 0 | 0 | 0 |
| $TI_n$ | 1 | 1 | 1 | 0 | 0 | 0 | 0 | 1 | 1 | 1 | 1 | 1 | 1 | 1 | 1 | 1 | 1 | 1 | 0 | 1 | 1 | 1 |
| $FZC_n$ | 0 | 0 | 0 | 0 | 0 | 0 | 1 | 0 | 0 | 0 | 0 | 1 | 0 | 0 | 0 | 0 | 0 | 1 | 0 | 0 | 0 | 0 |
| TI | | | | | | | 0 | | | | | 1 | | | | | | 1 | 0 | | | |

TABLE IIb

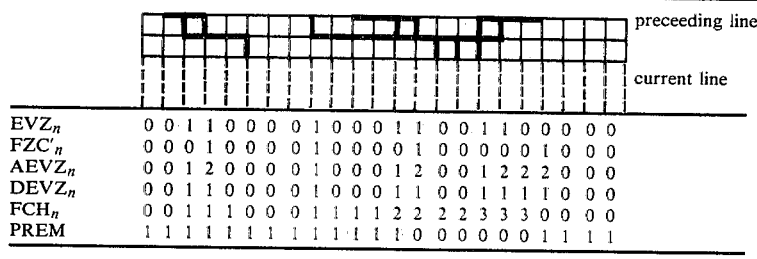

| | | | | | | | | | | | | | | | | | | | | |
|---|---|---|---|---|---|---|---|---|---|---|---|---|---|---|---|---|---|---|---|---|
| $EVZ_n$ | 0 | 0 | 1 | 1 | 0 | 0 | 0 | 0 | 1 | 0 | 0 | 0 | 1 | 1 | 0 | 0 | 1 | 1 | 0 | 0 | 0 | 0 |
| $FZC'_n$ | 0 | 0 | 0 | 1 | 0 | 0 | 0 | 0 | 1 | 0 | 0 | 0 | 0 | 1 | 0 | 0 | 0 | 0 | 1 | 0 | 0 | 0 |
| $AEVZ_n$ | 0 | 0 | 1 | 2 | 0 | 0 | 0 | 0 | 1 | 0 | 0 | 0 | 1 | 2 | 0 | 0 | 1 | 2 | 2 | 2 | 0 | 0 |
| $DEVZ_n$ | 0 | 0 | 1 | 1 | 0 | 0 | 0 | 0 | 1 | 0 | 0 | 0 | 1 | 1 | 0 | 0 | 1 | 1 | 1 | 1 | 0 | 0 |
| $FCH_n$ | 0 | 0 | 1 | 1 | 1 | 0 | 0 | 0 | 1 | 1 | 1 | 1 | 2 | 2 | 2 | 2 | 2 | 3 | 3 | 3 | 0 | 0 |
| PREM | 1 | 1 | 1 | 1 | 1 | 1 | 1 | 1 | 1 | 1 | 1 | 1 | 0 | 0 | 0 | 0 | 0 | 0 | 1 | 1 | 1 | 1 |

TABLE IIIa

| NL' | NL'$_1$ | α |
|---|---|---|
| 0 | 0 | 0 |
| ≧ 1 | 0 | 1 |
| 0 | ≧ 1 | 0 |
| ≧ 1 | ≧ 1 | ½ |

TABLE IIIb

| NL', NL'$_1$ | α |
|---|---|
| $|NL' - NL'_1| \leq 1$ | ½ |
| $NL' > NL'_1 + 1$ | ¾ |
| $NL' < NL'_1 - 1$ | ¼ |

TABLE IV

| E | EJ | E' | E'$_1$ | B' | $\tilde{E}$ | EE | EI | Numerisation step | number of bits |
|---|---|---|---|---|---|---|---|---|---|
| NM | NMJ | NM' | NM'$_1$ | NMB' | $\widetilde{NM}$ | NME | NMI | 1 (integer) | 2 |
| H | HJ | H' | H'$_1$ | HB' | $\tilde{H}$ | HE | HI | x (rational positive(*)) | 4 or 5 |
| V | VJ | V' | V'$_1$ | VB' | $\tilde{V}$ | VE | VI | x (rational positive(*)) | 4 or 5 |
| NP | NPJ | NP' | NP'$_1$ | NPB' | $\widetilde{NP}$ | NPE | NPI | 1 (integer) | 3 |
| S | SJ | S' | S'$_1$ | SB' | $\tilde{S}$ | SE | SI | symbol(**) | 1 |
| \|NS\| | \|NSJ\| | \|NS'\| | \|NS'$_1$\| | \|NSB'\| | \|$\widetilde{NS}$\| | \|NSE\| | \|NSI\| | 1 (integer(**)) | 2 |
| Q | QJ | Q' | Q'$_1$ | QB' | $\tilde{Q}$ | QE | QI | 1 (integer) | 1 |

Notes:
(*)In all cases, this number assumes all the discrete rational values of the segment [0.8], authorised by the number of available bits, for example for 4 bits the discretization step is 0.5 and the permitted values are (0, 0.5, 1, 1.5, 2, 2.5, 3, 3.5, 4, 4.5, 5, 5.5, 6, 6.5, 7, 7.5).
(**)(NS) Having the symbol S is designated NS (NSJ, NS, NS'$_1$, NSB', $\widetilde{NS}$, NSE, NSI) and is used with this notation in Tables V and IX.

TABLE V

| E' | E'$_1$ | B' |
|---|---|---|
| NM' | NM'$_1$ | NMB' = Max (NM', NM'$_1$) |

TABLE V-continued

| E' | E'$_1$ | B' |
|---|---|---|
| H' | H'$_1$ | HB' = \| αS'H' + (1 − α) S'$_1$ H'$_1$ \| |
| V' | V'$_1$ | VB' = αV' + (1 − α) V'$_1$ |
| NP' | NP'$_1$ | NPB' = αNP' + (1 − α) NP'$_1$ |
| NS' | NS'$_1$ | NSB' = αNS' + (1 − α) NS'$_1$ |
| Q' | Q'$_1$ | QB' = 0 |

TABLE VIa

| Z = H/V | θ |
|---|---|
| Z ≧ 7,6 | 7 |
| 4,6 ≦ Z < 7,6 | 6 |
| 2,6 ≦ Z < 4,6 | 5 |
| 1,4 ≦ Z < 2,6 | 4 |
| 0,9 < Z < 1,4 | 3 |
| 0,4 < Z ≦ 0,9 | 2 |
| 0,2 < Z ≦ 0,4 | 1 |

TABLE VIa-continued

| Z = H/V | θ |
|---|---|
| Z ≦ 0,2 | 0 |

TABLE VIb $$t = \begin{cases} H - V + 1 \text{ if } H \geq V \\ V - H + 1 \text{ if } H < V \end{cases}$$

| | | θ |
|---|---|---|
| H ≧ V | t > 3,4 | 7 |
| | 2,1 < t ≦ 3,4 | 6 |
| | 1,4 < t ≦ 2,1 | 5 |
| | 1 ≦ t ≦ 1,4 | 4 |
| H < V | 1 < t ≦ 1,7 | 3 |
| | 1,7 < t ≦ 3 | 2 |
| | 3 < t ≦ 8 | 1 |
| | t > 8 | 0 |

TABLE VII

| SS | Q | $\tilde{Q}$ | RUPTS |
|---|---|---|---|
| 1 | 1 | 0 | 1 |
| 1 | 0 | 1 | 0 |
| 0 | 0 | 0 | 0 |
| 0 | 1 | 0 | 0 |

TABLE VIII

| NM | β |
|---|---|
| 0 | 1 |
| 1 | ½ |
| ≧2 | ⅜ |

TABLE IX

| $\bar{H}$ | $\tilde{E}$ | EE | EI ($\bar{H} \neq 0$) | EI ($\bar{H} = 0$) |
|---|---|---|---|---|
| . | NM | if $\bar{H} \neq 0$: NME = NM + 1 | 1 | 0 |
| | | if $\bar{H} = 0$: NME = NM | | |
| $\bar{H}$ | $\tilde{H}$ | if $\bar{H} \neq 0$: HE = $\|\beta HS \pm (1-\beta)S\tilde{H}\|$ | $\bar{H}$ | 0 |
| | | if $\bar{H} = 0$: HE = $\tilde{H}$ | | |
| $\bar{V}$ | $\tilde{V}$ | if $\bar{H} \neq 0$: VE = $\beta(\bar{V} + N\bar{P}) \pm (1 - \beta)\tilde{V}$ | $\bar{V}$ | 0 |
| | | if $\bar{H} = 0$: VE = $\tilde{V}$ | | |
| . | N$\bar{P}$ | if $\bar{H} \neq 0$: NPE = 0 | 0 | 0 |
| | | if $\bar{H} = 0$: NPE = N$\bar{P}$ + 1 | | |
| $\bar{S}$ | N$\tilde{S}$ | if $\bar{H} \neq 0$ and NM ≧ 2: NSE = NS + $\bar{S}$ | SI = $\bar{S}$, \|NSI\| = 1 | SI = 1, \|NSI\| = 0 |
| | | if $\bar{H} \neq 0$ and NM ≦ 1: NSE = $\bar{S}$ | | |
| | | if $\bar{H} = 0$ and NM ≧ 1: NSE = NS | | |
| | | if $\bar{H} = 0$ and NM = 0: NSE = NM = 0 | | |
| . | $\tilde{Q}$ | QE = Q | 0 | 0 |

TABLE X

| | circuit 57a | | circuit 57b | | circuit 57c | | circuit 60 | |
|---|---|---|---|---|---|---|---|---|
| | OE₁ | OE₂ | OL₁ | OL₂ | AL₁ | AL₂ | E' | EJ |
| PL = 0 | 0 | FZC$_n$ | OL' | OLJ | AL' | ALJ | e'₁ | e'₂ |
| PL = 1 | FZC$_n$ | 0 | OLJ | OL' | ALJ | AL' | e'₂ | e'₁ |

TABLE XI

| | circuit 67 | | circuit 68 | | circuit 69a | | circuit 69b | | circuit 79 |
|---|---|---|---|---|---|---|---|---|---|
| | OEPP₁ | OEPP₂ | OLPP₁ | OLPP₂ | PP₁ | PP₂ | AEPP₁ | AEPP₂ | $\bar{P}_{n+1}$ |
| PL = 0 | HP | OE | HP | 0 | 0 | PP$_{n-J}$ | ALPP | AEP | P₁ |
| PL = 1 | OE | HP | 0 | HP | PP$_{n-J}$ | 0 | AEP | ALPP | P₂ |

TABLE XII

| θJ | NDECAJ | γJ | θJ | NDECAJ | γJ |
|---|---|---|---|---|---|
| −7 | −7 | 0 | 0 | 0 | 0 |
| −6 | −5 | ¼ | 1 | 1 | ¾ |
| −5 | −3 | ½ | 2 | 1 | ½ |
| −4 | −1 | ¾ | 3 | 1 | 0 |
| −3 | −1 | 0 | 4 | 2 | ¼ |
| −2 | 0 | ¼ | 5 | 4 | ½ |
| −1 | 0 | ½ | 6 | 6 | ½ |
| | | | 7 | 7 | 0 |

TABLE XIII

| TDECA | VPP$_{n-J}$ | PP$_{n-J}$ |
|---|---|---|
| 0 (NDECAJ < 7) | ≧ 1 | VPP$_{n-J}$ |
| | = 0 | 1 |
| 1 (NDECAJ = 7) | random | 0 |

What is claimed is:

1. For use in a differential coded pulse modulation coder or decoder a device for following and recursively estimating the local state of picture contours defined by lines of N points, N being an integer, said points being distributed in accordance with an orthogonal sampling structure, each line beginning with a line start signal DL and corresponding to a binary parity signal PL, said points being defined by successive numerical samples, wherein said device comprises:

(A) a sequential memory having three sections with an input which receives the sequence of numerical samples designated $\hat{X}_n$, in which n is a rank of the sample successively assuming integral values of 1 at N, and at least three outputs supplying, when the sample of rank n+1 is received at the input respectively: the sample of rank n, i.e. $\hat{X}_n$, the sample of rank n-1, i.e. $\hat{X}_{n-1}$ belonging to the same line as the sample received and the sample of rank n belonging to the preceding line, ie. $\hat{X}_n'$;

(B) an examination circuit incorporating:
means for detecting between two successive samples $\hat{X}_{n-1}$ and $\hat{X}_n$ of the same line, the presence of a variation in the value of the sample exceeding a certain threshold and for producing a corresponding signal called "the vertical contour element" and designated EV$_n$;

means for detecting between two samples $\hat{X}_n'$ and $\hat{X}_n$ of the same rank but belonging to two adjacent lines the presence of a variation in the value of the sample exceeding the same threshold and for producing a corresponding signal called "horizontal contour element" and designated EH$_n$;

two connected contour elements, an image contour then being defined by a system of connected contour elements;

means for detecting the absence of a contour element at the point of rank n, said means supplying a signal designated HOLE$_n$;

means for counting the total number of horizontal contour elements and the total number of vertical contour elements examined along a line for each connected zone, said numbers being converted into signals $\overline{H}$ and $\overline{V}$ at the end of the connected zone;

means for detecting the connected horizontal and vertical contour elements and for detecting the systems of such connected elements along a line, said systems being called connected zones and each connected zone being between a first contour element and a last contour element, said means being able to supply a signal when a connected zone ends at a point of rank n, the signal being designated $FZC_n$;

the examination circuit thus having the three inputs receiving the samples $\hat{X}_n$, $\hat{X}_{n\text{-}1}$ and $\hat{X}_n{'}$ and six outputs respectively supplying the signals $EV_n$, $EH_n$, $\overline{V}$, $\overline{H}$, $FZC_n$, $HOLE_n$;

(c) a loop functioning in a recursive manner and incorporating the means for calculating a magnitude representative of the contour and called state of the contour and designated E for storing the state E' obtained for the line preceding that which is examined and for calculating as a function of said state E and signals $EH_n$, $HOLE_n$, $FZC_n$, $\overline{V}$ and $\overline{H}$ obtained for the examined line the new state E of the contour on said examined line.

2. For use in a differential coded pulse modulation coder or decoder, a device for predicting samples for pictures defined by lines of N points, N being an integer, distributed along an orthogonal sampling structure, said points being defined by numerical samples and wherein the device comprises:

(A) a device according to claim 1 for following and recursively estimating the local state of the picture contours in which:

the sequential memory is provided with two supplementary outputs supplying samples $\hat{X}_{n-J+1}$ and $\hat{X}_{n-J}$;

the examination circuit has two outputs respectively supplying:

(i) a signal designated $EV_n$ indicating the presence of a vertical contour element for the point of rank n, (ii) the signal $FZC_n$; the recursive loop has an output supplying a signal designating EJ determining the state of the contour at the point of rank n−J;

(B) a circuit for the preparation of a prediction and storing said prediction, this circuit having five main inputs, two of them receiving the samples $\hat{X}_{n-J}$ and $\hat{X}_{n-J+1}$ supplied by the memory, the three others receiving the signals EJ, $EV_n$ and $FZC_n$ supplied by the circuit for the examination and recursive estimation of the state of the contour, whereby the prediction preparation circuit incorporates means for calculating a linear combination of signals $\hat{X}_{n-J}$ and $\hat{X}_{n-J+1}$ which is dependent on the state EJ and signals $EV_n$ and $FZC_n$, and a direct access memory which stores the combination at an address depending on the rank n−J and the state EJ, said memory having an output which supplies a signal $\overline{P}_{n+1}$ for the input sample of rank n+1;

(C) a circuit for the final calculation of the prediction which has two inputs, one receiving the sample $X_n$ from the memory and the other the signal $\overline{P}_{n+1}$ from the prediction preparation circuit, said circuit incorporating the means for selecting $\overline{P}_{n+1}$ or $\hat{X}_n$, depending on the information contained in $\overline{P}_{n+1}$ and for applying the selected value, i.e. $\overline{P}_{n+1}$ to an output, said signal constituting the prediction sample of rank n+1.

3. A device according to claims 1 or 2, wherein the recursive loop of the examination and estimation circuits comprises:

a first memory, called the state memory receiving signals E and $FZC_n$ relative to the line being examined and and end of connected zone signal $FZC_n{'}$ for the preceding line and supplying a state signal E' relative to the preceding line, as well as the state signal EJ relative to a possible connected zone at the point of rank n−J of the present or current line;

a second memory with N registers which receives the end of connected zone signal $FZC_n$ relative to the line being examined and which supplies the signal $FZC_n{'}$ relative to the preceding line;

a third memory receiving the signal $EV_n$ and supplying a signal $EV_n{'}$ relative to the preceding line;

a circuit for the analysis of the connected zones from one line to the next, said circuit having six inputs respectively receiving the signals $EH_n$, $HOLE_n$ and $FZC_n$ from the connected zone examination circuit and E', $FZC_n{'}$ and $EV_n{'}$ from the three memories, said circuit having means for extracting from the signals received by it three signals useful for the study of a connected zone and relative to that part of the preceding line in contact with the said connected zone, said three signals being respectively:

signal $\overline{S}$ giving the orientation sign of the picture contour as observed in the current line, a signal TI indicating the necessity for an initialization of the state at the start of the contour, a signal $\tilde{E}$ relative to a prior equivalent state for the connected zone being examined in the case of the observation of a fork, i.e. a situation where two different connected zones of the preceding line are both connected to the same connected zone of the line being examined;

a circuit for re-updating the state having five inputs respectively receiving the signals $\overline{H}$ and $\overline{V}$ from the connected zone examination circuit and $\overline{S}$, TI and $\tilde{E}$ from the connected zone analysis circuit from one line to the next and one output supplying a state signal E obtained either from the prior state $\tilde{E}$ and more recent observations $\overline{S}$, $\overline{H}$, $\overline{V}$ or solely from the more recent observations $\overline{S}$, $\overline{H}$, $\overline{V}$, said case being indicated by the signal TI.

4. A device according to claim 2, wherein the connected zone examination circuit comprises:

(A) a first channel for processing horizontal contour elements incorporating:

a first difference circuit with two inputs receiving the signals $\hat{X}_n{'}$ and $\hat{X}_n$ and an output supplying a vertical gradient signal $GV_n$;

a first comparator receiving the signal $GV_n$ and supplying the logic signal $EH_n$ representing a horizontal contour element;

an output supplying the signal $EH_n$;

a first accumulator receiving the signals $EH_n$ and counting them to supply a signal $\overline{H}_n$ representing the number of vertical contour elements, said accumulator being zeroed by the $HOLE_n$ signal;

a second comparator which receives the signal $\overline{H}_n$ and compares it with a predetermined number and supplies an overshoot signal $DH_n$ when $\overline{H}_n$ exceeds said number;

a logic excluvie-OR circuit having two inputs respectively receiving the signal $\widetilde{S}$ extracted from the state signal $\widetilde{E}$ and the signal S extracted from the connected zone analysis circuit from one line to the next and an output supplying a signal SS;

a combinatory circuit having two inputs respectively receiving a signal $\widetilde{Q}$ extracted from signal $\widetilde{E}$ and signal SS and two outputs, one supplying a signal RUPTS and the other a signal Q;

a logic OR circuit having three inputs respectively receiving the signal TI, the signal TI, the signal RUPT$\theta$ and the signal RUPTS and one output supplying a signal RUPT;

an arithmetic and logic circuit for re-updating the states having 9 inputs respectively receiving the signal $\widetilde{Q}$ and the signals from $\widetilde{E}$: namely $\widetilde{NM}$, $\widetilde{NS}$, $\widetilde{H}$, $\widetilde{V}$, $\widetilde{NP}$, as well as the observation signals H, V and S and one output supplying a re-updating signal EE;

a transcoder with theee inputs respectively receiving the signals $\overline{H}$, $\overline{V}$ and $\overline{S}$ and an output supplying an initialized state signal EI;

a selector having two inputs receiving the signals EE and EI, a control input receiving the signal RUPT and an output supplying the signal E.

8. A device according to claim 3, wherein the state memory comprises:

an accumulator circuit having an input receiving the signal $FZC_n$, said accumulator being accuated by the service signal HP and reset to zero by DL and having and output supplying a signal AE;

a second accumulator circuit having an input receiving the signal $FZC_n$ and actuated by the signal PL and with two outputs supplying the signals $OE_1$ and $OE_2$;

a memory circuit having an input receiving the signal $FZC_n$ actuated by HP and an output supplying the signal $FZC_{n-J}$;

a OR gate having two inputs receiving the signal $FZC_{n-J}$ and DL and outputs supplying a signal OLJ;

an accumulator having two inputs receiving signals $FZC_{n-J}$ and DL actuated by HP and an output supplying a signal ALJ;

a second OR gate having two inputs receiving a signal $FZC_n'$ and DL actuated by HP and an output supplying a signal AL';

a branching circuit with two inputs receiving the signals OLJ and OL' and with two outputs supplying the signals $OL_1$ and $OL_2$, said branching circuit being actuated by P1;

a second branching circuit having two inputs receiving the signals ALJ and AL' actuated by PL and having two outputs supplying the signals $AL_1$ and $AL_2$;

a first direct access memory actuated by HP and having five inputs receiving the signals AE, E, $OE_1$, $AL_1$ and $OL_1$ and one output supplying the signal $E_1'$;

a second direct access memory actuated by HP and having five inputs receiving the signals AE, E, $OE_2$, $AL_2$ and $OL_2$ and one output supplying a signal $E_2'$;

a third branching circuit actuated by PL having two inputs receiving the signals $E_1'$ and $E_2'$ and two outputs supplying the signal E' and EJ.

9. A device according to claim 2, wherein the prediction preparation and storage circuit comprises:

a first memory having an input receiving the signal $EV_n$ and an output supplying a delayed signal $EV_{n-J}$;

an inverting circuit having an input receiving $EV_{n-J}$ and supplying a complementary signal $\overline{EV}_{n-J}$;

a second memory having an input receiving the signal $FZC_n$ and an output applying a delayed signal $FZC_{n-J-1}$;

a logic AND gate having two inputs respectively receiving the signals $\overline{EV}_{n-J}$ and $FZC_{n-J-1}$ and an output supplying $DI_{n-J}$;

a flip-flop having two inputs respectively receiving the signals $EV_{n-J}$ and $DT_{n-J}$ and an output supplying a signal $ZC_{n-J}$;

a logic OR gate with two inputs, one receiving the timing signal HP and the other the signal $ZC_{n-J}$ and an output supplying a signal OE;

a branching circuit having two inputs, one receiving the timing signal HP, the other the signal OE and a control input receiving the signal PL, as well as two outputs respectively supplying a signal $OEPP_1$ and a signal $OEPP_2$;

a second branching circuit with two inputs respectively receiving the timing signal and a zero value signal 0, a controlled input receiving the service signal PL and two outputs respectively supplying signals $OLPP_1$ and $OLPP_2$;

a transcoder circuit having two inputs respectively receiving the signals HJ and VJ extracted from the state signal EJ and with two outputs respectively supplying a signal J and a signal NDECAJ;

a comparator relative to a specified number having an input receiving the signal NDECAJ and an output supplying the signal TDECA;

a counter with one zeroing input receiving the service signal DL and one input receiving the timing signal HP and one output supplying a signal n;

an arithmetic circuit having two inputs respectively receiving the signals NDECAJ and n and an output supplying the signal AEP corresponding to n−J=NDECAJ;

an adder having two inputs, one receiving the number n and the other the number 1 and an output supplying the signal ALPP corresponding to n+1;

a first branching circuit having two inputs respectively receiving the signal $PP_{n-J}$ and a zero signal) and a control input receiving the service signal PL and with two outputs respectively supplying the signals $PP_1$ and $pp_2$;

a second branching circuit having two inputs respectively receiving the signals ALPP and AEP, a control input receiving the service signal PL and two outputs respectively supplying signals $AEPP_1$ and $AEPP_2$;

a first direct access memory having five inputs respectively receiving the signals $OEPP_1$, $OLPP_1$, $AEPP_1$ ALPP and $pp_1$ and an output supplying a signal $p_1$;

a second direct access memory RAM having five inputs respectively receiving the signals $OEPP_2$, $OLPP_2$, $AEPP_2$, ALPP and $pp_2$ and an output supplying a signal $p_2$;

a selector having two inputs respectively receiving the signals $p_1$ and $p_2$ having a control input receiving the service signal PL and an output supplying a prepared prediction signal $P_{n+1}$.

10. A device according to claim 2, wherein the circuit for the final calculation of the prediction comprises:

a first register which loads the signal $\overline{H}_n$ and is controlled by the signal $FZC_n$ supplying the signal H for the number of horizontal contour elements of the connected zone examined;

an inverter receiving $EH_n$ and supplying a complementary signal $\overline{EH}_n$;

(B) a second channel for processing vertical contour elements incorporating:

a second difference circuit with two inputs receiving the signals $X_n$ and $X_{n-1}$ and one output supplying a horizontal gradient signal $GH_n$;

a second comparator receiving the signal $GH_n$ and supplying the logic signal $EV_n$ representing the vertical contour element;

an output supplying the signal $EV_n$;

a second accumulator receiving the signals $EV_n$ and counting them to supply the signal $\overline{V}_n$ representing the number of horizontal contour elements, said accumulator being zeroed by the $HOLE_n$ signal;

a second comparator which receives the signal $\overline{V}_n$ and compares it with a predetermined number and supplies an overshoot signal $DV_n$ when $\overline{V}_n$ exceeds said number;

a second register which loads the signal $\overline{V}_n$ and which is controlled then by the signal $FZC_n$ and supplies the signal $\overline{V}$ for the number of vertical contour elements in the connected zone examined;

a comparator receiving the signal $\overline{V}_n$ and comparing this signal with 1 and supplying a signal $DZV_n$;

(C) a logic OR gate with three inputs respectively receiving the signals $DH_n$, $\overline{EH}_n$ and $DV_n$ and one output supplying this $HOLE_n$;

(D) an AND gate with two inputs receiving the signals $HOLE_n$ and $DZV_n$ and one output supplying the signal $FZC_n$.

5. A device according to claim 3, wherein the connected zone analysis circuit from one line to the next incorporates:

a first delay circuit having one input receiving the $HOLE_n$ signal and one output supplying the delayed signal $HOLE_{n-1}$;

a register with two inputs, one being a signal input and the other a writing authorisation input respectively receiving the signals $HOLE_{n-1}$ and $EV'_n$ and one output supplying the signal $EH_{n-1}$;

a second delay circuit with one input receiving the signal $EH_n$ and one output supplying a signal $EH_{n-1}$;

a logic OR gate with two inputs receiving the signals $EH_{n-1}$ and $EH_n$ and an output supplying a signal $EHH_n$;

a logic AND gate having two inputs receiving the signals $EHH_n$ and $EV_n'$ and an output supplying a signal $EVZ_n$;

a first channel for the processing of signal $EVZ_n$ incorporating:

(i) a first accumulator having a zeroing input receiving the $HOLE_n$ signal, the signal input receiving $EVZ_n$ and an output supplying a signal $EVZ_n$;

(ii) a first comparator relative to 1 having an input receiving $EVC_n$ and an output supplying a signal $TI_n$;

(iii) a register having a writing input receiving the signal $FZC_n$, a signal input receiving $TI_n$ and an output supplying a signal TI indicating the necessity of an initialization;

a second channel for processing the signal $EVZ_n$ incorporating;

(i) a second accumulator having a zeroing input receiving the signal $FZC_n'$, a signal input receiving $EVC_n$ and an output supplying the signal $AEVZ_n$;

(ii) a second comparator relative to 1, an input receiving $AEVZ_n$ and an output supplying a signal $DEVZ_n$;

(iii) an accumulator having a zeroing input receiving the $HOLE_n$ signal, a clock authorization input receiving the signal $DEVZ_n$, an input receiving a signal 1 and an output supplying a signal $FCH_n$;

(iiii) a comparator relative to 1 having one input receiving the signal $FCH_n$ and one output supplying a control signal PREM;

a delay circuit having a clock authorization input HP receiving $FZC_n'$, a signal input receiving the state signal $E'$ and an output supplying a state signal $EV_1'$;

an arithmetic and logic circuit having two inputs, one receiving the $E_1'$ and the other $E'$, and one output supplying a weighting signal $B'$ for the signals $E_1'$ and $E'$;

finally, a selector circuit having one control input receiving the signal PREM, two inputs receiving the signals $B'$ and $E'$ and an output supplying the equivalent state signal $\widetilde{E}$ in the presence of a fork.

6. A device according to claim 5, wherein the arithmetic and logic circuit comprises:

two adder circuits with two inputs respectively receiving the signals $NP_1'$ and $NM_1'$ regrouping certain bits of the state signal $E_1'$ and $NP'$ and $NM'$ extracted from the state signal $E'$ and one output respectively supplying the signals $NL_1' = NM_1' + NP_1'$ and $NL' = NM' + NP'$;

a transcoder circuit having two inputs receiving the signals $NL_1'$ and $NL'$ and one output supplying a weighting factor α which serves to take account of the relative length of two contours;

an arithmetic and logic circuit having three inputs receiving α, $E'$ and $E_1'$ and one output supplying the signal $B'$.

7. A device according to claim 3, wherein the re-updating of the local state circuit comprises:

a first transcoder having two inputs receiving horizontal and vertical contour element signals $\widetilde{H}$ and $\widetilde{V}$ extracted from the state signal $E'$ and an output supplying a signal $\widetilde{\theta}$ corresponding to the absolute value of a prior orientation angle of the contour;

a second transcoder having two inputs receiving horizontal and vertical contour elements signals $\overline{H}$ and $\overline{V}$ from the connected zone examination circuit and an output supplying a signal $\overline{\theta}$ corresponding to the absolute value of an orientation angle of the examined contour;

a threshold difference circuit having two inputs receiving the signals $\widetilde{\theta}$ and $\theta$ and an output supplying a signal $T\theta$;

a second comparator circuit relative to 2 having an input receiving a signal $\widetilde{NM}$ extracted from the state signal $\widetilde{E}$ and representing the number of operations of the contour and one output supplying a signal RNM;

a logic AND gate having two inputs respectively receiving the signals $T\theta$ and TNM and one output supplying a signal $RUPT\theta$;

a decoding circuit having an input receiving the signal $\overline{P}_{n+1}$ and which detects the disappearance of $\overline{P}_{n+1}$ and has an output supplying a signal COM;

a selector having two inputs respectively receiving the signals $\overline{P}_{n+1}$ and $\hat{X}_n$ and a control input receiving the signal COM and an output supplying the signal $P_{n+1}$.

11. A differential coded pulse modulation coder incorporating:

a subtractor with two inputs, one receiving a numerical sample $X_n$ and the other a numerical prediction signal $P_n$ and an output supplying a difference signal $d_n$;

a quantizer—coder receiving the signal $d_n$ and supplying a coded signal $C_n$;

a quantizer—ddecoder receiving the signal $C_n$ and supplying a reconstituted difference signal $\hat{d}_n$;

an adder with two inputs respectively receiving the signal $\hat{d}_n$ and a prediction signal $P_n$ and an output supplying a sample $\hat{X}_n$;

a prediction circuit receiving $X_n$ and supplying the prediction signal $P_n$, wherein the prediction circuit is as claimed in claim 2.

12. A differential coded pulse modulation coder incorporating:

a subtractor with two inputs, one receiving a numerical sample $X_n$ and the other a numerical prediction signal $P_n$ and an output supplying a difference signal $d_n$;

a quantizer—coder receiving the signal $d_n$ and supplying a coded signal $C_n$;

a quantizer receiving the signal $d_n$ and supplying a reconstituted difference signal $\hat{d}_n$;

an adder with two inputs respectively receiving the signal $\hat{d}_n$ and a prediction signal $P_n$ and an output supplying a sample $\hat{X}_n$;

a prediction circuit receiving $X_n$ and supplying the prediction sample $P_n$; wherein the prediction circuit is as claimed in claim 2.

13. A differential coded pulse modulation decoder incorporating:

a quantizer—decoder receiving the coded samples $C_n$ obtained by a coder according to claims 11 or 12, said quantizer supplying a difference signal $\hat{d}_n$;

an adder with two inputs respectively receiving the signal $\hat{d}_n$ and a prediction signal $P_n$ and an output supplying a sample $\hat{X}_n$;

a prediction circuit receiving $\hat{X}_n$ and supplying the prediction signal Pn, wherein the prediction circuit is as claimed in claim 2.

* * * * *